(12) United States Patent
Isoyama et al.

(10) Patent No.: US 6,340,108 B1
(45) Date of Patent: Jan. 22, 2002

(54) HOT ROLLING METHOD AND EQUIPMENT

(75) Inventors: Shigeru Isoyama, Chiba; Takeshi Hirabayashi, Chiyoda-ku; Takahiro Yamasaki; Takushi Kagawa, both of Chiba; Kazunori Nagai, Hiroshima; Naohiko Ishibashi, Hiroshima; Takashi Okai, Hiroshima, all of (JP)

(73) Assignees: Kawasaki Steel Corporation, Kobe; Mitsubishi Heavy Industries, LTD, Tokyo, both of (JP)

( * ) Notice: Subject to any disclaimer, the term of this patent is extended or adjusted under 35 U.S.C. 154(b) by 0 days.

(21) Appl. No.: 09/623,086

(22) PCT Filed: Jun. 22, 1999

(86) PCT No.: PCT/JP99/03314

§ 371 Date: Aug. 28, 2000

§ 102(e) Date: Aug. 28, 2000

(87) PCT Pub. No.: WO00/78474

PCT Pub. Date: Dec. 28, 2000

(51) Int. Cl.[7] ................................................. B23K 1/00
(52) U.S. Cl. ........................ 228/102; 228/103; 228/158; 228/173.1; 228/235.2; 228/5.7; 228/9
(58) Field of Search ................................. 228/102, 103, 228/158, 173.1, 173.6, 173.7, 164, 235.2, 235.3, 5.7, 8, 9, 10, 11, 12; 226/3, 9, 10, 15, 16; 72/199

(56) References Cited

U.S. PATENT DOCUMENTS

| | | | |
|---|---|---|---|
| 4,353,238 A | * | 10/1982 | Breton et al. |
| 4,706,871 A | * | 11/1987 | Kajiwara et al. |
| 5,234,154 A | * | 8/1993 | Kajiwara et al. |
| 5,284,284 A | * | 2/1994 | Narishima et al. |
| 5,871,138 A | * | 2/1999 | Shishido et al. |

FOREIGN PATENT DOCUMENTS

| | | | |
|---|---|---|---|
| JP | 358092806 A | * | 6/1983 |
| JP | 360225013 A | * | 11/1985 |
| JP | 4-167911 | | 6/1992 |
| JP | A 7-284808 | | 10/1995 |
| JP | 8-117812 | | 6/1996 |
| JP | A 9-19703 | | 1/1997 |
| JP | 9-19703 | | 1/1997 |
| JP | 9-19704 | | 1/1997 |
| JP | A 9-19704 | | 1/1997 |
| JP | A 9-99309 | | 4/1997 |
| JP | 9-103806 | | 4/1997 |
| JP | 10-166002 | | 6/1998 |

OTHER PUBLICATIONS

Derwent (1982–03967J) Gulyaev et al.*

* cited by examiner

*Primary Examiner*—Tom Dunn
*Assistant Examiner*—Kiley Stoner
(74) *Attorney, Agent, or Firm*—Oliff & Berridge, PLC

(57) ABSTRACT

Assuming that the processes of joining, rolling, coiling, etc. of a material is evaluated by a preset speed pattern after the extraction from a heating furnace, the required time is predicted and calculated for both of a preceding material and a following material. At the time when the following material can catch up with the preceding material at an aiming position on the line, the following material is extracted from the heating furnace according to the result of the above prediction calculation. Control is carried out so that both of the preceding material and the following material finish the process at a preset speed. Also, the traveling speed of the following material is controlled according to the position and the speed of the tail edge of the preceding material in a section close to the catch-up position so that a distance between the tail edge of the preceding material and the leading edge of the following material be closed. Thereby, three of the tail edge of the preceding material, the leading edge of the following material, and a movable joining apparatus are controlled at the aiming position on the hot rolling line so as to be in a positional relationship suitable for joining, by which the joining operation is completed properly in the travel zone of the joining apparatus.

33 Claims, 19 Drawing Sheets

HOT ROLLING METHOD AND EQUIPMENT

TECHNICAL FIELD

The present invention relates to a hot rolling method and equipment. More particularly, it relates to a hot rolling method and equipment which are suitable for being used when rolling is performed by joining the tail edge of a preceding material and the leading edge of a following material to each other during traveling and supplying the materials to a rolling mill continuously, and which are capable of stably joining the preceding material and the following material to each other during traveling.

BACKGROUND ART

Conventionally, on a hot rolling line, a plurality of slabs to be rolled have been heated in advance, and after the completion of heating, the slabs are rough rolled and finish rolled one after another to give a hot rolled plates a desired thicknesses. With this method, the line is sometimes stopped by poor biting of rolled material in finish rolling. Also the yield greatly decreases because of odd shapes of the leading edge and tail edge of the rolled materials. For this reason, in recent years, a rolling method has been used in which the tail edge of a preceding metal block and the leading edge of a following metal block are joined to each other during traveling and the joined material is supplied to a finish rolling mill continuously.

For example, Unexamined Japanese Patent Publication No. 7-1008 relating to a joining method of plates with continuous rolling equipment has disclosed a joining method. In this joining method, to start with, a distance between the tail edge portion of a preceding plate and the leading edge portion of a following plate is made zero by colliding the opposing faces with each other so as to form a required distance accurately and easily, to improve the heating performance of the opposing faces and to obtain a fine joined portion, and then either the preceding plate or the following plate is moved to form the distance between the plate edge faces. Subsequently, an alternating magnetic flux is applied to the edge portion of those plates in the thickness direction, an eddy current is induced in the respective portions to heat them by Joule heat, and the edge portion of those plates is pushed to each other by pressurizing means to complete joining.

Also, Unexamined Japanese Patent Publication No. 6-226320 has disclosed a technique in which when to extract slabs from heating furnaces are controlled in order that plates after rough rolling are joined accurately at a predetermined position and rolled continuously.

Further, Unexamined Japanese Patent Publication No. 7-188785 relating to a hot rolling method in which plates are not joined has disclosed a method of controlling extraction pitches from heating furnaces properly. In this method, the extraction pitches are controlled to appropriate values so that the temperature of heated materials be kept the same in spite of unexpected change of the condition of rolling line and a sudden change of furnace temperature is restrained.

However, the above-described conventional methods are not sufficient for making a following metal block catch up with a preceding metal block and for joining each other during traveling by a movable joining apparatus.

DISCLOSURE OF THE INVENTION

An object of the present invention is, on a hot rolling line, to make following metal block catch up with preceding one and to obtain stable joining.

To achieve the above object, the present invention provides a hot rolling method in which the tail edge of a preceding material and the leading edge of a following material are joined to each other during traveling by a movable joining apparatus after hot rough rolling, and the joined materials are fed to a finish rolling mill to be rolled, characterized in that the speed of the following material is controlled according to the position of the tail edge of the preceding material so that a distance between the tail edge of the preceding material and the leading edge of the following material become a desired value, whereby the tail edge of the preceding material and the leading edge of the following material are joined to each other during traveling.

Also, in the hot rolling method, an (aiming) distance between the tail edge of the preceding material and the leading edge of the following material is determined in advance as a function of at least the moving tail edge position of the preceding material, the actual tail edge position of the preceding material is measured, the (aiming) distance between the tail edge of the preceding material and the leading edge of the following material is determined from the measured tail edge position of the preceding material and the function, and the (actual) position of the leading edge of the following material is controlled by the speed of the following material so as to obtain the distance, whereby the leading edge of the following material approaches and joins the tail edge of the preceding material while the preceding material is traveling.

Also, in the hot rolling method, the speed of the following material is controlled according to the position of the tail edge of the preceding material so that a distance between the tail edge of the preceding material and the leading edge of the following material become a desired value, and the traveling speed of the joining apparatus is controlled so that a determined point in the moving joining apparatus coincide with the tail edge of the preceding material, whereby the leading edge of the following material approaches and joins the tail edge of the preceding maternal while the preceding material is traveling.

Also, in the hot rolling method, a distance between the tail edge of the preceding material and the leading edge of the following material is determined in advance as a function of the moving tail edge position of the preceding material, the actual tail edge position of the preceding material is measured, the aiming distance between the tail edge of the preceding material and the leading edge of the following material is determined from the measured tail edge position of the preceding material and the function, and the actual position of the leading edge of the following material is controlled by the speed of the following material so as to obtain the distance, and the traveling speed of the joining apparatus is controlled so that determined point in the moving joining apparatus coincide with the tail edge of the preceding material, whereby the leading edge of the following material approaches and joins the tail edge of the preceding material while the preceding material is traveling.

Further, when the determined point in the joining apparatus coincides with the tail edge of the preceding material, the tail edge of the preceding material is restrained by restraint means, and after the restraint of the preceding material is completed, the speed of the following material is increased so that the following material be brought into contact with the tail edge of the preceding material.

Further, when the determined point in the joining apparatus coincides with the tail edge of the preceding material, the tail edge of the preceding materials restrained by restraint means, and when the distance between the tail edge of the preceding material and the leading edge of the following material becomes a predetermined value or less, the leading edge of the following material is restrained by the restraint means.

Further, after the restraint of the tail edge of the preceding material and the leading edge of the following material is completed, the tail edge of the preceding material and the leading edge of the following material are closed and brought into contact with each other until a predetermined load occurs.

Further, after the tail edge of the preceding material and the leading edge of the following material are closed and brought into contact with each other, they are separated and a predetermined distance is given.

Further, after the restraint of the tail edge of the preceding material is completed, the speed control of the joining apparatus is changed over to the speed control for making a tension of the preceding material a desired value.

Further, an image pickup device is provided on the joining apparatus so that the tail edge position of the preceding material be detected by the image pickup device.

Further, an image pickup device is provided on the joining apparatus so that both of the tail edge position of the preceding material and the leading edge position of the following material be detected by the image pickup device.

Also, the present invention provides hot rolling equipment which joins the tail edge of a preceding material and the leading edge of a following material to each other during traveling by using a movable joining apparatus after hot rough rolling, and feeds the materials to a finish rolling mill to roll the same, characterized in that an image pickup device, which can image both of the tail edge of the preceding material and the leading edge of the following material, is provided on the joining apparatus.

It is preferable that a preparatory period of time from when the tail edge of the preceding material is cut to when the leading edge of the following material is cut be taken so as to provide a distance between the tail edge of the preceding material and the leading edge of the following material.

Also, it is preferable that at the starting position of the joining apparatus, the distance between the tail edge of the preceding material and the leading edge of the following material have a determined value or less.

Also, the positions of the tail edge of the preceding material and the leading edge of the following material may be corrected according to the detection result of the image pickup device.

BEST MODE FOR CARRYING OUT THE INVENTION

Embodiments of the present invention will now be described with reference to the accompanying drawings.

Figure 1:
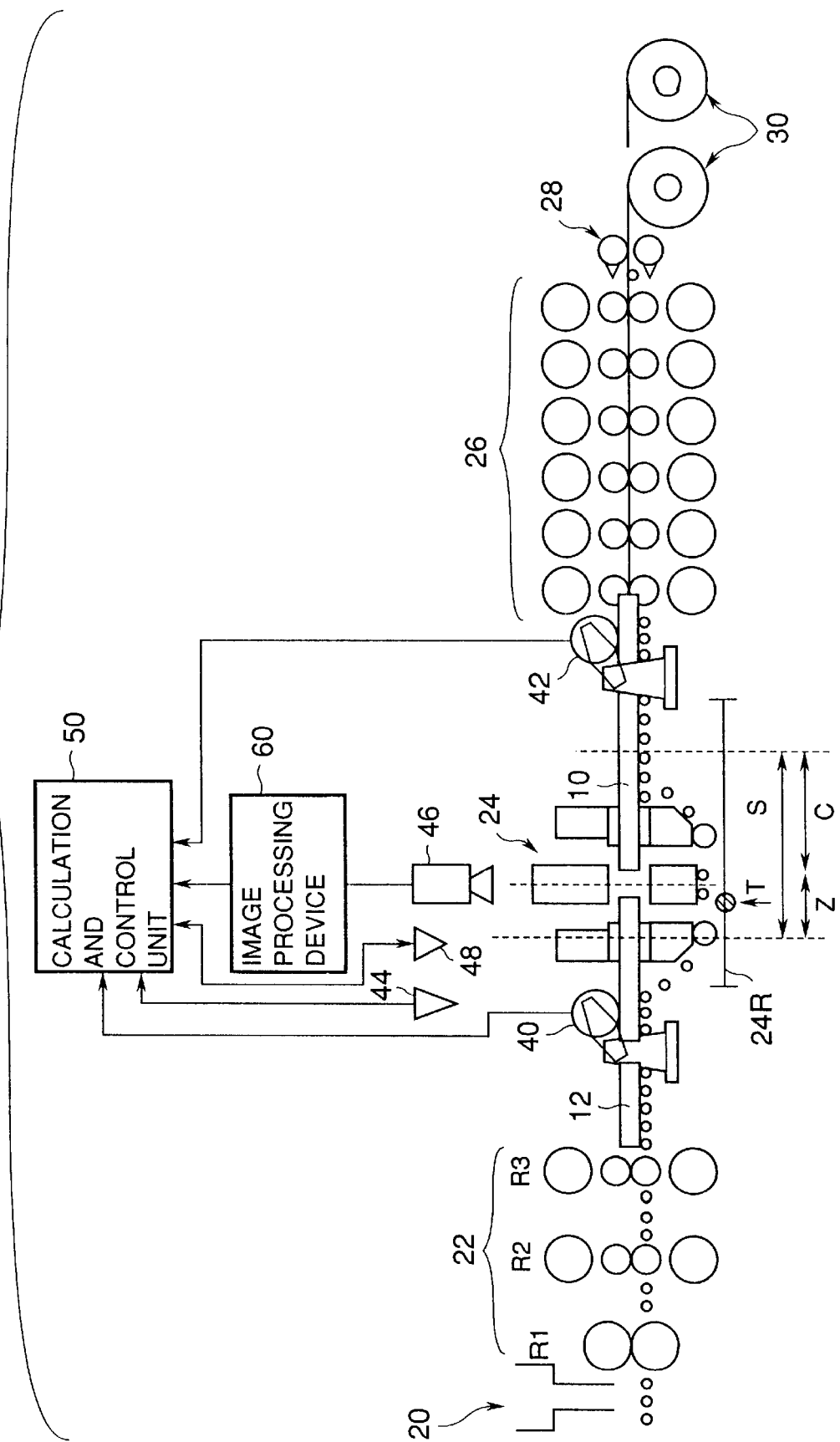
FIG. 1 is a process view showing a configuration of a continuous hot rolling line to which a first embodiment of the present invention is applied.

As shown in FIG. 1, a hot rolling line to which a first embodiment of the present invention is applied comprises a heating furnace 20 for heating metal blocks, a rough rolling mill 22 of, for example, three stands of R1 to R3 for rough rolling metal blocks heated by the heating furnace 20, a movable joining apparatus 24 for joining the tail edge of a preceding metal block (also referred to as a preceding material) 10 to the leading edge of a following metal block (also referred to as a following material) 12 during traveling, a finish rolling mill (hot strip mill) 26 of, for example, six stands of F1 to F6 for hot finish rolling a metal block joined by the joining apparatus 24, a strip cutting apparatus 28 for cutting a strip rolled by the finish rolling mill 26 to a length suitable for coiling, and a coiler 30 for coiling a strip cut by the strip cutting apparatus 28.

The joining apparatus 24 reciprocates within the traveling stroke S (denotes a traveling range of the determined point in the joining apparatus) on rails 24R, and is adapted to perform joining when it runs from the left to the right in FIG. 1. The starting position of the joining apparatus 24 is preferably the aiming position (point) T where the leading edge of a following metal block 12 catches up with the tail edge of a preceding metal block 10. Further, the configuration is such that even if the point where the catching up is actually completed is somewhat deviated from the aiming point, the deviation amount falls in a catch-up range Z at most. The joining operation is performed in the joint zone C, which is a zone obtained by excluding a traveling zone required from the start of catching up to the completion thereof from the traveling stroke S of the joining apparatus 24.

Figure 2:
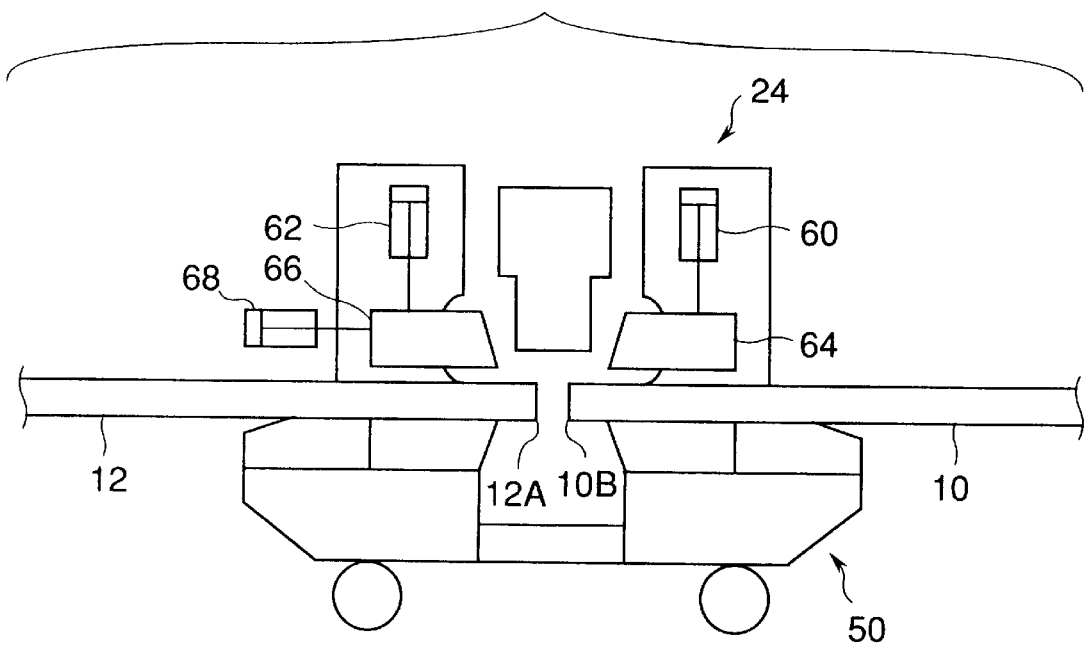
FIG. 2 is a sectional view showing an example of a movable joining apparatus used in the embodiment of the present invention.

As shown in FIG. 2 in detail, for example, the joining apparatus 24 is provided with clamps 64 and 66 for holding metal blocks vertically by being pushed by clamp cylinders 60, 62, which are fluid pressure cylinders of liquid pressure or air pressure, and an upset cylinder 68, which is a fluid pressure cylinder for moving the entrance-side clamp 66 on the side of the following metal block 12 in the traveling direction.

In the present invention, there are further provided, at a predetermined point, position/speed detectors 40 and 42 for detecting the position and speed of metal blocks, a metal detector 44 for optically detecting the presence of a metal block by using, for example, a laser beam, and a one-dimensional or two-dimensional image pickup device (for example, a CCD camera) for imaging a planar shape of metal blocks from the upside of the metal block.

Figure 3:
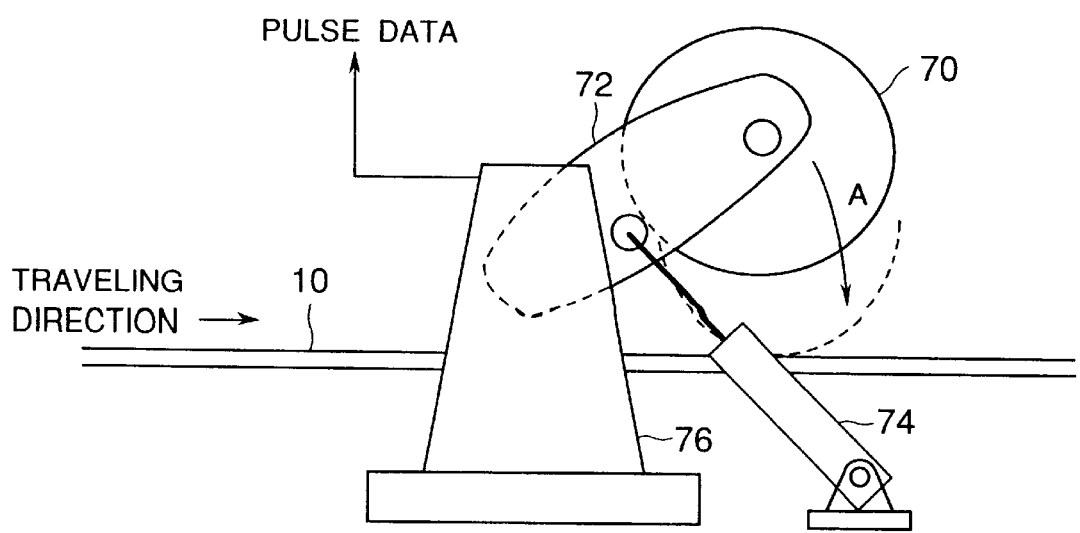
FIG. 3 is a front view showing a construction of a position/speed detector used in the embodiment of the present invention.

As shown in FIG. 3 in detail, for example, each of the position/speed detectors 40, 42 comprises a measurement roll 70 which is pushed on the surface of a metal block 10 as shown by the arrow mark A and rotates according to the traveling amount of the metal block 10, an arm 72 for holding the measurement roll 70, a fluid pressure cylinder (for example, an air cylinder) 74 for pushing the measurement roll 70 on the surface of the metal block 10 by pulling down the arm 72 to the lower side in FIG. 3, and a base 76, and is adapted to output pulse data according to the rotation of the measurement roll 70.

The metal detector 44 is disposed between the rough rolling mill 22 and the joining apparatus 24, and the position/speed detector 40 is disposed between the rough rolling mill 22 and the joining apparatus 24 and on the upstream side of the metal detector 44. The position/speed detector 42 is disposed between the joining apparatus 24 and the finish rolling mill 26. The image pickup device 46 is disposed on the joining apparatus 24. The image pickup device 46, which moves together with the joining apparatus 24, is disposed at a point above on the joining apparatus 24, where the tail edge portion of the preceding metal block 10 and the leading edge of the following metal block 12 can be imaged during joining.

More preferably, a metal detector 48 for optically detecting the presence of a metal block by using, for example, a laser beam is provided on the joining apparatus 24. The metal detector 48 moves together with the joining apparatus 24, and is disposed at a predetermined point of the upstream side on the joining apparatus 24 (for example, on the 1.2 meter upstream side from the determined position).

As a metal detector 44, 48, for example, a hot metal detector (HMD) which detects a metal block by using heat or light emitted from hot metal blocks, or a cold metal detector (CMD) using a laser beam emission/reception is used. As the metal detector 44, 48, the CMD of a laser beam type is preferable in order to increase the detection speed of the leading and tail edges of metal blocks. The ordinary HMD has some spread of visual field angle because it operates in the principle that it detects infrared rays emitted from a hot metal block. Contrarily, regarding the laser beam type CMD, the detector itself emits a laser beam having no spread of angle, and it detects the passage of the leading and tail edges of metal blocks by the fact that the beam is shut out and does not come to the receiver side. Therefore, the detector of this type has high detection accuracy.

Usable metal detector can be a back light type, an emitting light detecting type such as a HMD, a light cutting type, and other light detection types, or a thermometer type etc. other than the laser beam type. Also, the installation point is not limited on the truck or on the ground.

The output of the image pickup device 46 is inputted to an calculating and control unit 50 through an image processing device 60 together with the outputs of the position/speed detectors 40 and 42 and the metal detectors 44 and 48.

When a following metal block catches up with and joins a preceding metal block during traveling, the rotational speed of motors for table rollers, the traveling speed of the following material, the rotational speed of a motor for traveling the joining apparatus 24, and the speed of the joining apparatus 24 are controlled by the output of an calculating and control unit, which is not shown in FIG. 1.

Also, as described in detail later, the signals from the metal detectors 44 and 48 and the image pickup device 46 disposed at determined points in the equipment train shown in FIG. 1 are inputted in the image processing device 60 and the calculating and control unit 50, by which the rotational amount of the table roller and the tracking of the preceding material and the following material are corrected by the position/speed detectors 40 and 42.

The following is a description of the timing of extraction from the heating furnace 20.

It is assumed that the traveling speed, weight, thickness schedule, etc. of the preceding metal block 10 have already been known, and the traveling speeds of the preceding metal block 10 and the following metal block 12 have been known in advance at the time long before the traveling control is actually carried out, for example, before both of the preceding metal block 10 and the following metal block 12 are extracted from the heating furnace 20. If not only the speed of the following metal block 12 at the time when the following metal block 12 catches up with the preceding metal block 10, but also the below listed data of the preceding metal block 10 and the following metal block 12 about i) traveling speed pattern from the extraction from the heating furnace to the completion of catching up,
 ii) thickness schedule in rough rolling,
 iii) width schedule in rough rolling, and
 iv) weight of metal block (in the case where at least one of the rough rolling mills 22 is reversible) have been known in advance, the time when the tail edge of the preceding metal block 10 reaches the aiming catch-up point T and the period of time required for the following metal block 12 to catch up with the tail edge of the preceding metal block 10 after it is extracted from the heating furnace 20 become known.

For example, a required time difference tFceP (second) at the time of extraction from the heating furnace for the leading edge of the following metal block to catch up with the tail edge of the preceding metal block can be calculated by the following equation.

$$tFceP = tFceP(\text{preceding}) - tFceP(\text{following}) \quad (1)$$

where, tFceP(preceding) is the time (second) required for the tail edge of the preceding metal block to reach the aiming catch-up point after it is extracted from the heating furnace, and tFceP(following) is the time (second) required for the leading edge of the following metal block to reach the aiming catch-up point after it is extracted from the heating furnace.

Therefore, the following metal block 12 is extracted from the heating furnace 20 at the time obtained by reverse calculation of period of time from the extraction of the following metal block 12 to the catch-up time. In the present invention, it is preferable to extract metal blocks at the above-described extraction pitch, but is might not be limited this way.

In comparison with the result of predictive calculation of each process executed before the extraction from the heating furnace, the actual period of time of traveling might be different within several seconds at most when the joining operation is actually performed. This error is caused by the fact that the actual traveling speed has an error with respect to the prediction of the traveling speed of metal blocks.

The factors causing the deviation of traveling speed of the preceding metal block from the prediction seem to include manual interventions by operators in the successive in finish rolling, the difference between the actual and the predicted values of rolling backward slip at the first stand F1 of the finish rolling mill, and the acceleration and deceleration of traveling speed caused by thickness change during rolling.

Similarly, the factors causing the deviation of traveling speed of the following metal block from the prediction seem to include the difference between the actual and the predicted values of rolling forward slip in rough rolling, in the case where at least one of the rough rolling mills is reversible, the difference between the actual and the predicted values of metal block length caused by thermal expansion or the measurement error of weight, and the difference between the actual and the predicted values of idle time between passes.

Considering the degree of deviation of catch-up position (catch-up range Z in FIG. 1) caused by these factors, the traveling stroke S of the joining apparatus 24 should be designed to be long enough to allow the error. If the resultant error is found during the actual process, the traveling speed of the following metal block might be accelerated or decelerated so that the error be made up for, by which the catch-up point on the line can be controlled the same.

Also, by introducing the above-described control before the line is constructed, how long the length of the aiming catch-up range Z can be shortened is estimated in advance. Thereby, the line length can be designed to be short, and the construction cost can be reduced.

Now, referring to FIGS. 4 and 5, a procedure for joining metal blocks extracted at extraction pitches, for example, determined by the above-described method will be described in detail.

First, after the tracking of the following material started (Step 1000), the speed of the following material 12 is controlled (Step 1010) so that the distance between the tail edge 10B of the preceding material and the leading edge 12A of the following material become the aiming distance g until both of the tail edge of the preceding material (Step 1020) and the leading edge of the following material (Step 1030) are cut by the crop cutting apparatus described later.

After the leading edge 12A of the following material is cut, the speed of the following material 12 is controlled so that the desired distance (gap) g or a constant distance g1 be obtained until restraint of the tail edge 10B of the preceding material is completed by restraint means (clamp 64) of the joining apparatus 24 (Steps 1040, 1050 and 1060).

On the other hand, after the tail edge 10B of the preceding material is cut and the tail edge passes through a position at which the joining apparatus 24 is to start (Step 1100), the joining apparatus 24 starts (Step 1110), and the speed is raised to a predetermined value (Steps 1120 and 1130).

The speed of the joining apparatus 24 is controlled so that the determined point in the joining apparatus 24 coincide with the tail edge 10B of the preceding material (Step 1140). When the determined point in the joining apparatus 24 coincides with the tail edge 10B of the preceding material (Step 1150), the restraint means (clamp 64) of the joining apparatus 24 starts to clamp the tail edge 10B of the preceding material (Step 1160).

The tail edge positioning control of the joining apparatus is continued until the clamping of the tail edge 10B of the preceding material is completed. After the clamping is completed (Step 1170), the speed control of the joining apparatus 24 is changed over to the control for making the tension of the preceding material 10 positioned between the joining apparatus 24 and the finish rolling mill 26 a desired value (Step 1180).

Also, after the clamping of the tail edge 10B of the preceding material is completed (Step 1170), the speed of the following material 12 is made faster than the speed of the preceding material 10 to decrease the distance between the tail edge 10B of the preceding material and the leading edge 12A of the following material (Step 1200).

When the distance between the tail edge 10B of the preceding material and the leading edge 12A of the following material becomes g2 (<g1) or less (Step 1210), the restraint means (clamp 66) of the joining apparatus 24 starts to clamp the leading edge 12A of the following material (Step 1220).

After the clamping of the leading edge 12A of the following material is completed (Step 1230), the speed of the following material 12 is made the same as the speed of the preceding material 10, and the two materials travel (Step 1240).

While the following material 12 travels at the same speed as that of the preceding material 10, the distance is closed until a predetermined load occurs by the upset cylinder 68 (Step 1250). Subsequently, the distance is opened to a distance g3 suitable for heating and joining (Step 1260).

After the heating and joining are completed (Step 1270), both of the clamps for the tail edge 10B of the preceding material and the leading edge 12A of the following material are released (Step 1280). The speed control (speed control for making the tension of the preceding material 10 positioned between the joining apparatus 24 and the finish rolling mill 26 a desired value) is finished, and the joining apparatus 24 returns to the starting position from a position to which the apparatus has moved while the heating and joining are performed (Step 1290).

By repeating the above procedure, rolled materials are supplied to the finish rolling mill 26 continuously.

Figure 6:
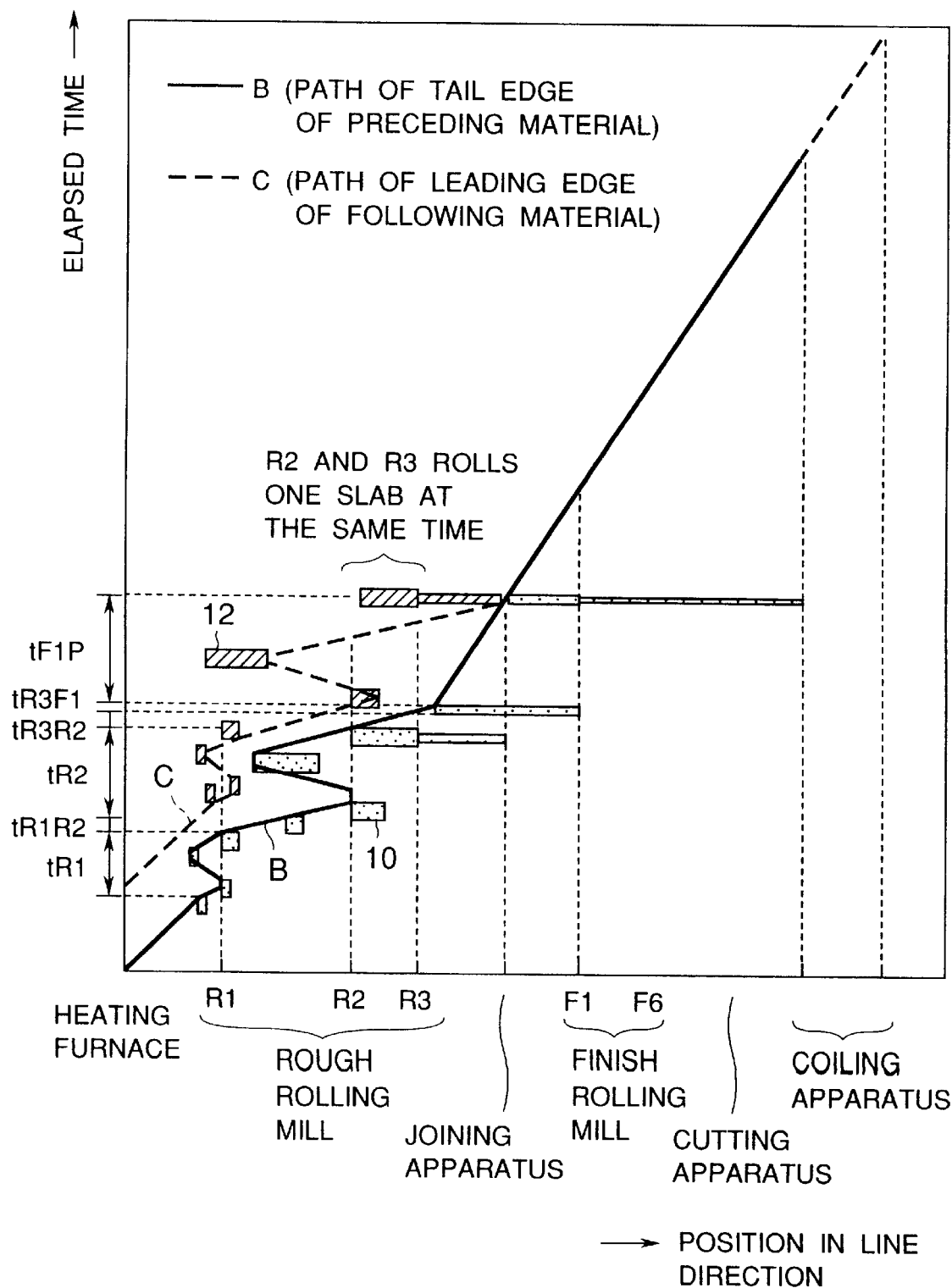
FIG. 6 is a diagram showing a state in which the leading edge of a following material catches up with the tail edge of a preceding material in the first embodiment.

FIG. 6 schematically shows the positions on the line and the time required for reaching each position, and an example of catch-up traveling pattern. In FIG. 6, the solid line B indicates the path of the tail edge 10B of the preceding material, the broken line C indicates the path of the leading edge 12A of the following material, the reference character tR1 on the ordinate indicates the rolling time at the first stand R1 of the rough rolling mill, tR1R2 indicates the time elapsing from when the rolling at the R1 stand finishes to when the rolling starts at the second stand R2 of the rough rolling mill, tR2 indicates the rolling time at the second stand R2 of the rough rolling mill, tR3R2 indicates the time elapsing from when the rolling finishes at the second stand R2 of the rough rolling mill to when the rolling at the R3 stand finishes, tR3F1 indicates the time elapsing from when the rolling at the R3 stand finishes to when the rolling at the first stand F1 of the finish rolling mill starts, and tF1P indicates the time required for the leading edge of the following material 12 to catch up with the tail edge of the preceding material 10 after the F1 stand starts to roll the leading edge of the preceding material 10. A state can occur in which one metal block is rolled simultaneously at the second stand R2 and the third stand R3 of the rough rolling mill.

Normally, the tracking of traveling hot rolled materials is performed by the rotational amount of the table roller, the contact type measurement roll 70, or a non-contact type speedometer (for example, using the laser Doppler effect). However, these have an error, so the material tracking is generally corrected by the metal detector such as a HMD or a CMD disposed on the line.

However, since the positional relationship between the joining apparatus 24 and the material edges is important, the material tracking requires a high accuracy. The reason for this is that the poor tracking causes poor adjustments of materials in the joining apparatus and for example in the induction heating system, the density of current flowing in the preceding material and the following material does not become equal, and also for example in laser welding, the misalignment of laser beam position leads to poor welding. Concerning the position accuracy, the relative positional relationship between the tail edge of the preceding material and the determined position of the joining apparatus is especially important. If the tail edge of the preceding material can be clamped exactly, it is necessary that the following material is simply pushed on the tail edge of the preceding material.

Even if the correction is made by the output of the metal detector, the dispositions of the metal detectors are regulated mechanically, and the correction cannot be made always during the traveling of the joining apparatus. Therefore, even during the adjustment of the joining apparatus with the tail edge of the preceding material performed while the joining apparatus 24 is traveling, the tracking deviates little by little. For this reason, the image pickup device 46, which has a visual field covering front and rear side of the determined point T of the joining apparatus 24, is disposed on the joining apparatus 24 so that the relative position with respect to the determined point T be detected by the image processing device 50, and the correction control is carried out to make a misadjustment zero. Thereby, the accuracy of adjustment between the determined point T of the joining apparatus 24 and the tail edge position of the preceding material is maintained. Needless to say, the error of relative position can be controlled within an allowable range.

It is ideal that at the time when the joining apparatus completes its acceleration the adjustment of the tail edge of the preceding material with the determined point in the joining apparatus 24 coincides for shortening the running zone of the joining apparatus 24. Thereupon, the material tracking before the starting of the joining apparatus 24 is also important.

However, the visual field of the image pickup device 46 cannot be made wider than its resolution allows, so when to start the joining apparatus 24 can be before the tail edge of the preceding material enters the visual field of the image pickup device 46. Therefore, the metal detector 48 can be disposed on the entrance side of the position where the joining apparatus 24 starts so that the tail edge position of the preceding material be corrected by the passage of the metal detector 48, and the start command for the joining apparatus 24 is given.

Needless to say, the metal detector 44 fixed on the ground also can correct the tracking.

The metal detector 48 is preferably provided on the joining apparatus 24 in the vicinity of the image pickup device 46, but it can also be provided on the ground.

Also, the metal detector 48 can correct the tracking of the leading edge of the following material.

Figure 7:
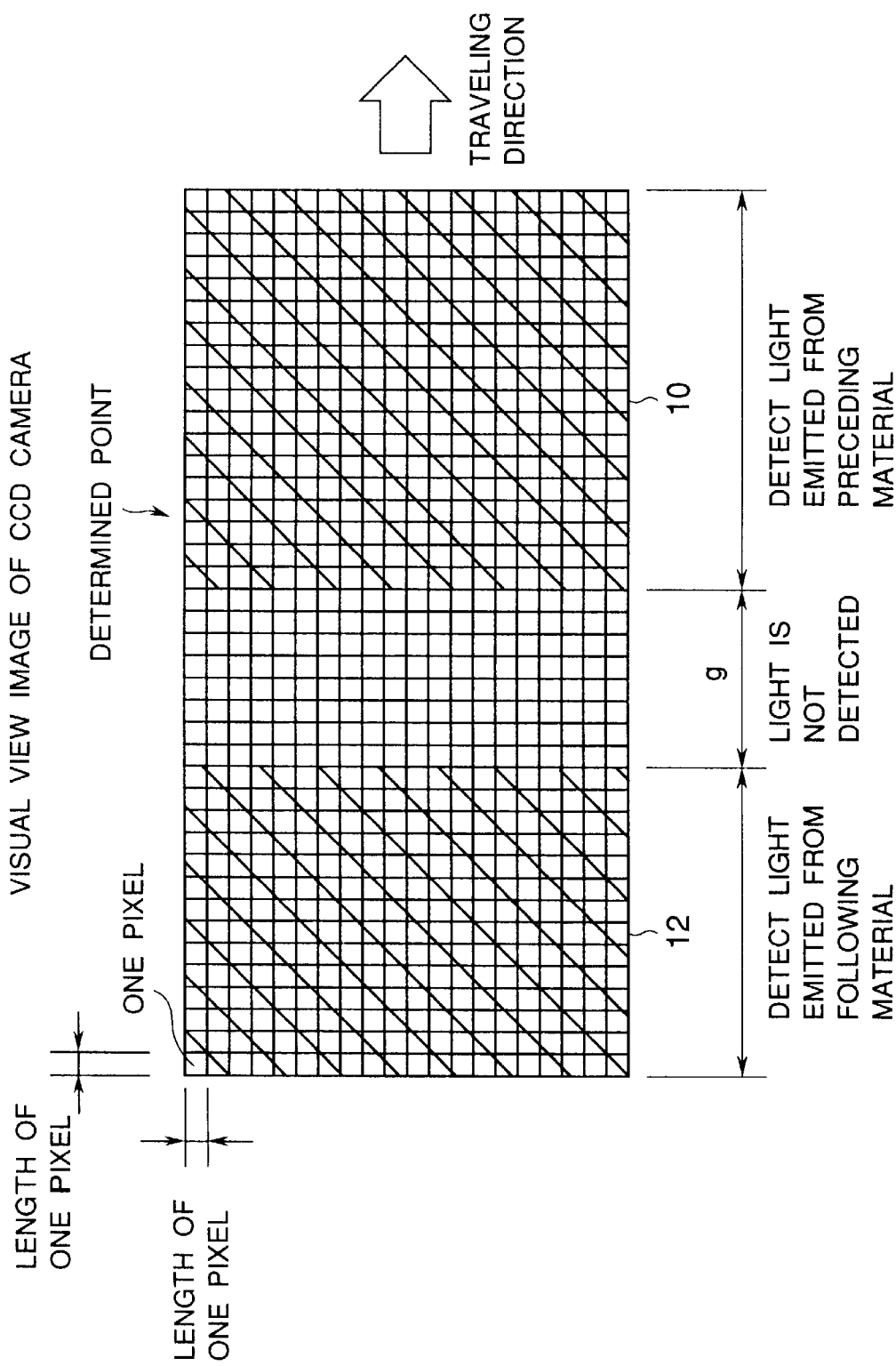
FIG. 7 is a diagram showing an example of a visual field image of an image pickup device provided on an upper portion of the joining apparatus in accordance with the present invention.

In making the tracking correction, using the image taken by image pickup device 46, the presence of a metal block is detected by the light emitted from the metal block (light is emitted because of hot steel) through each finely divided fine pixels as shown in FIG. 7. If the determined point in the joining apparatus 24 on the line, the determined point in the joining apparatus 24, and the determined point of the visual field image of the image pickup device 46 have been determined in advance, by judging the number of pixels that detect light in the traveling direction from the right end of the image processing screen, for example, as shown in FIG. 7, the tail edge position of the preceding material 10 can be found. Also, by summing up the length of one pixel in the traveling direction for all pixels that does not detect light, the leading edge position of the following material 12 and the distance g between both materials can be calculated.

In running control of the joining apparatus 24, the tail edge position of the preceding metal block 10 is detected by the visual field image taken by the image pickup device 46, and the joining apparatus 24 is controlled so that the determined point of the visual field image (for example, the determined point of the visual field image caused to coincide with the determined point in the joining apparatus 24) coincide with the tail edge position of the preceding metal block 10. For example, in the case of the induction heating system, the determined point in the joining apparatus 24 should be set at the center of the inductor, and in the case of the laser joining system, it should be set at the center of the laser beam. At the time of heating and joining, when the distance is opened to g3, the tail edge of the preceding material and the determined point in the joining apparatus 24 are preferably shifted by ½ of g3.

While the running control of the joining apparatus 24 is carried out, the speed of the following metal block 12 is controlled every moment so that the distance g between the preceding metal block and the following metal block be kept constant at a position just before (for example, about 100 mm) the leading edge of the following metal block 12 arrives at the tail edge of the preceding metal block 10. This eliminates the possibility that while the joining apparatus 24 be controlled so that the determined point in the joining apparatus 24 coincide with the tail edge position of the preceding metal block 10, the leading edge of the following metal block 12 comes into contact with the tail edge of the preceding metal block 10 to obstruct the visual field, so that the tail edge position of the preceding metal block cannot be detected by the image, and the control for causing the determined point in the joining apparatus 24 to coincide with the tail edge position of the preceding metal block 10 cannot be continued.

The time when the joining apparatus 24 begins to run is preferably the time before the tail edge 10B of the preceding metal block passes through the determined point and after the fact that the leading edge 12A of the following metal block transfers onto the joining apparatus 24 be detected. This is because there is a time lag from the joining apparatus 24 starts to it reaches a constant speed. Also, since the following metal block has a higher speed than the preceding metal block, and the joining apparatus 24 pursues the preceding metal block 10, if the joining apparatus 24 starts after the leading edge of the following metal block rides on the joining apparatus 24, the following metal block 12 can be conveyed with its leading edge 12 on board the joining apparatus 24 until the joining operation is finished, so that there be no possibility that the following metal block 12 is left behind.

Figure 8:
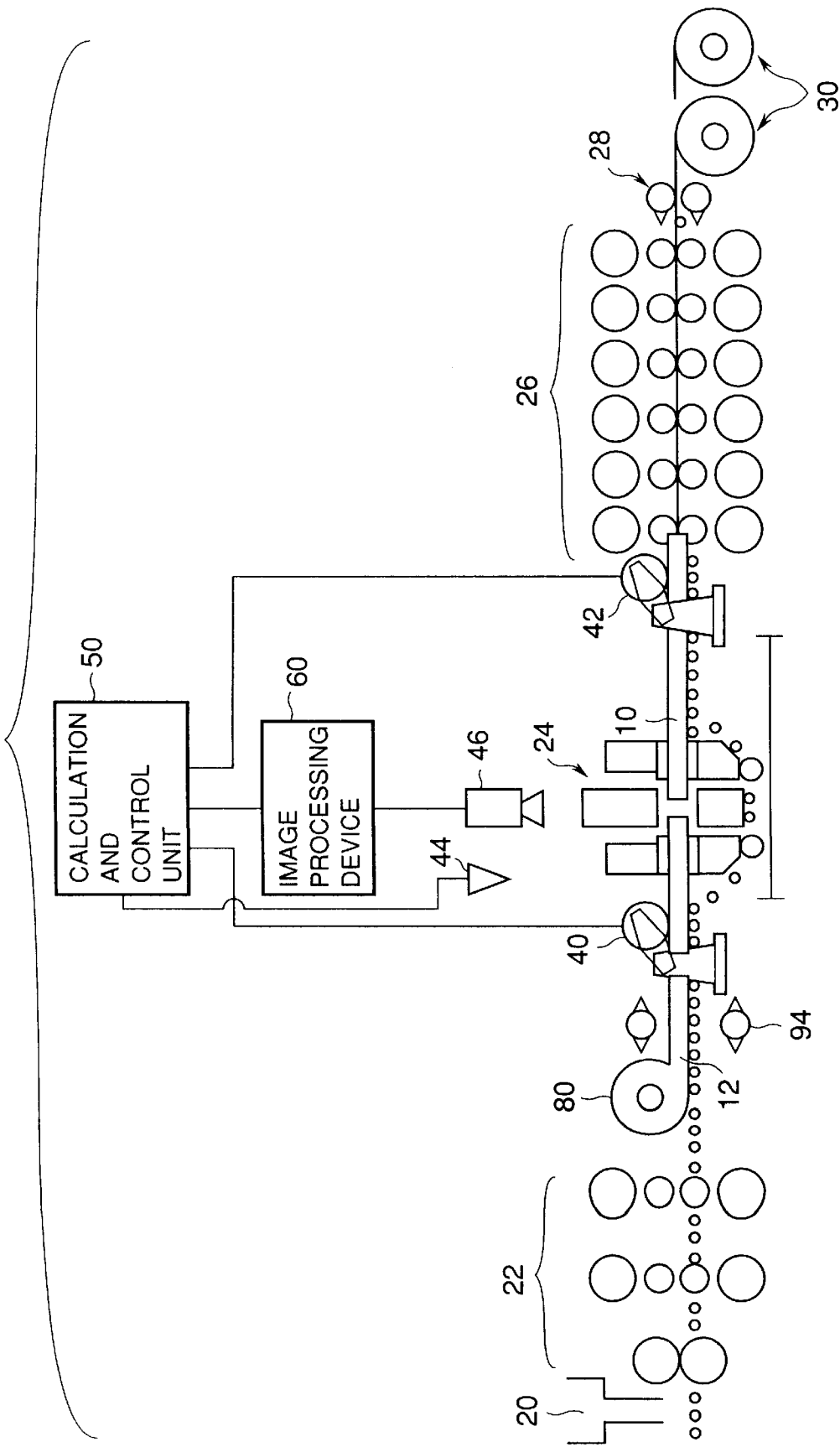
FIG. 8 is a process view showing a configuration of a continuous hot rolling line to which a second embodiment of the present invention is applied.

Although the bars after being rough rolled are joined directly in the first embodiment, the present invention can be applied to an equipment train provided with a coiling/uncoiling apparatus 80 for adjusting the timing between the rough rolling mill 22 and the finish rolling mill 26 as in a second embodiment shown in FIG. 8. In the case of the second embodiment, if the speed pattern of the following metal block after it is uncoiled from the coiling/uncoiling apparatus 80 and before the catching up is completed is known, the required time from uncoiling to catching up becomes known.

For example, the required time tP (second) from when the tail edge of the preceding metal block begins to be uncoiled from the coiling/uncoiling apparatus 80 to when the leading edge of the following metal block catches up with the tail edge of the preceding metal block can be calculated by the following equation.

$$tP = tCB1 + tCB2 + tCB3 \quad (2)$$

where tCB1 to tCB3 are required time (second) for each of sections LCB1 to LCB3 between the coiling/uncoiling apparatus 80 and the aiming catch-up position T.

Figure 9:
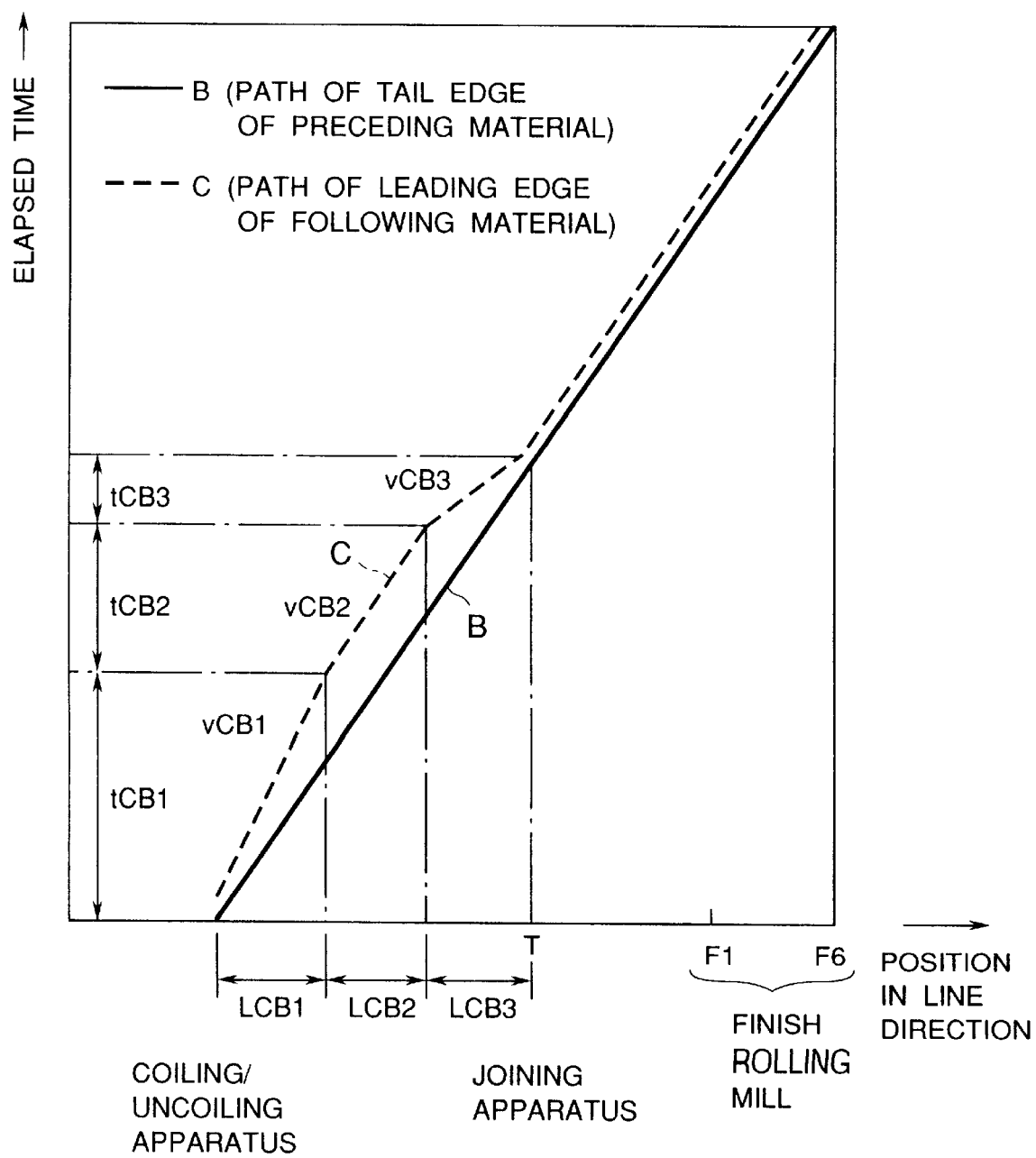
FIG. 9 is a diagram showing a state in which the leading edge of a following material catches up with the tail edge of a preceding material in the second embodiment.

Therefore, as in the case where the coiling/uncoiling apparatus 80 is not provided as well, when to extract the following metal block from the heating furnace is determined by reverse calculation, and when it comes, it is necessary only that the following metal block is extracted from the heating furnace 20. This example is shown in FIG. 9. The reference characters vCB1 to vCB3 in FIG. 9 denote the traveling speed corresponding to the sections LCB1 to LCB3.

In the catch-up control as described above, in the above embodiments, a force for pushing the following metal block on the preceding metal block is given, and when the pushing force reaches a predetermined value, it is judged that the closing is completed. Therefore, even if the corner portion is not at right angles, or even if the longitudinal cross section is not rectangular, it can be judged that both metal blocks surely come into contact with each other. Also, since the cross section after the crop cutting by using a shear has burrs and protrusions created at the time of cutting, this method is effective. Further, even if the cross section is at right angles, when the distance between both metal blocks is several millimeters or less, there arises a problem in that the distance cannot be recognized because of the limitation of resolution of the image pickup device 46, so that this method is still effective.

As means for pushing the following metal block 12 toward the preceding metal block 10, the upset cylinder 68 for moving the entrance-side clamp 66 in the traveling direction is used as shown in FIG. 2. Alternatively, a device as shown in FIG. 10 can be used, in which the metal blocks are held vertically by pinch rolls 82 and 84 which are pushed down by clamp cylinders 60 and 62, and the entrance-side pinch roll 84 for the following metal block is rotated by a motor 86.

Figure 10:
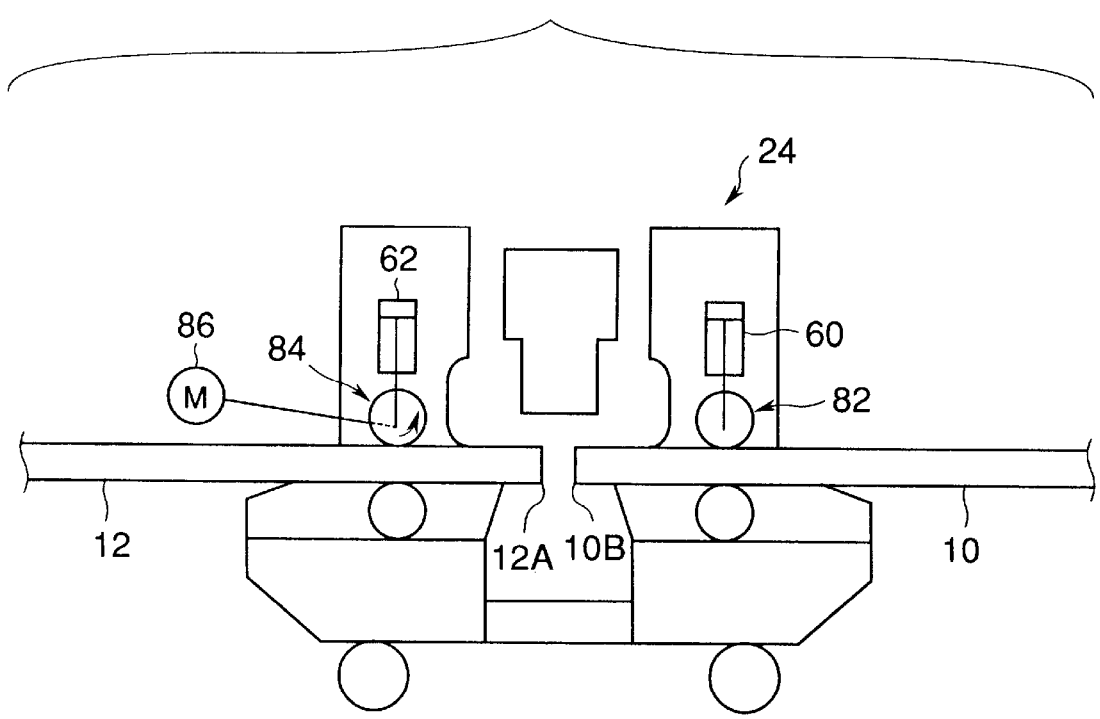
FIG. 10 is a sectional view showing another example of a movable joining apparatus used in the embodiment of the present invention.

In the configuration shown in FIG. 10, it is preferable that the preceding metal block 10 be held by the delivery-side pinch roll 82 just after the tail edge of the preceding metal block 10 passes through a position just under the entrance-side pinch roll 82, and the following metal block 12 be held by the entrance-side pinch roll 84 when the leading edge 12A of the following metal block passes through a position just under the entrance-side pinch roll 84.

As the method for detecting the pushing force, in the configuration in which the following metal block is pushed in the traveling direction by the upset cylinder 68 as shown in FIG. 2, the fluid pressure of the upset cylinder 68 can be measured to obtain the pushing force, or a load cell (not shown) can be provided on the back of the delivery-side clamp 64 to detect the pushing force. Also, in the configuration in which the pinch rolls are used as shown in FIG. 10, a method can be used in which the torque of the motor 86 for rotating the entrance-side pinch roll 84 is measured.

Although the metal blocks are restrained by the restraint means (the clamps 64 and 66, or the pinch rolls 82 and 84) provided on the joining apparatus 24 in the above description, the restraint means may not be provided on the joining apparatus, but may be adapted to move independently out of the joining apparatus. The movable restraint means may be of a self-propelled type or a follow-up type that follows up the rolled material.

Also, the restraint means need not be movable. In this case, the restraint means can be at least a pair of pinch rolls which is disposed on each of the downstream and upstream sides of the joining apparatus to rotatably hold the preceding material and the following material therebetween. With this means, the speed of the following material is controlled by the pinch rolls provided on the upstream side of the joining apparatus, by which the distance between the tail edge of the preceding material and the leading edge of the following material can be controlled with high accuracy.

Heating and joining are performed after the tail edge of the preceding material and the leading edge of the following material are closed until a predetermined load occurs, or when a predetermined gap is opened after the closure.

Figure 4:
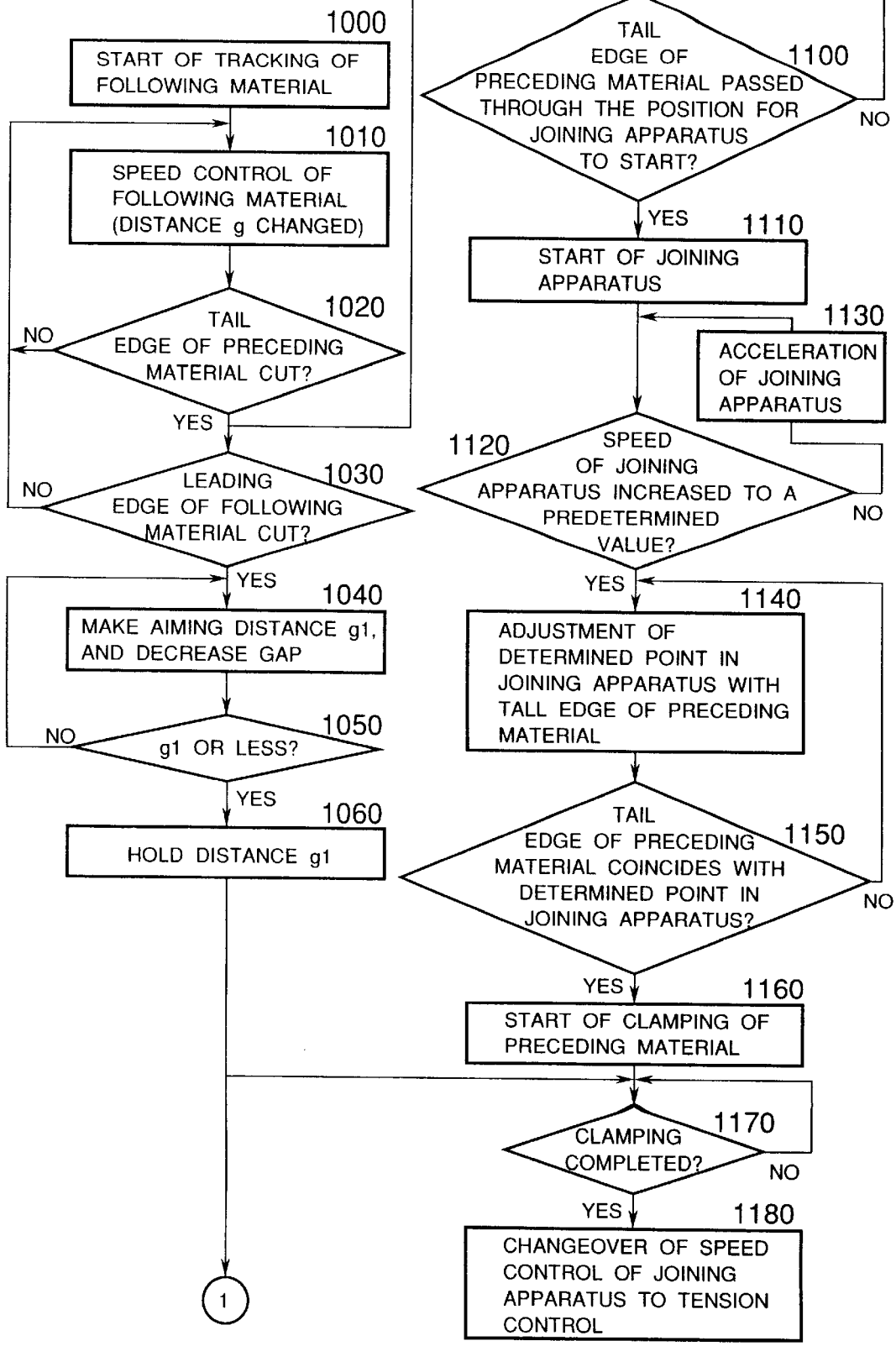
FIG. 4 is a flowchart showing the first half of processing procedure in the first embodiment.
Figure 5:
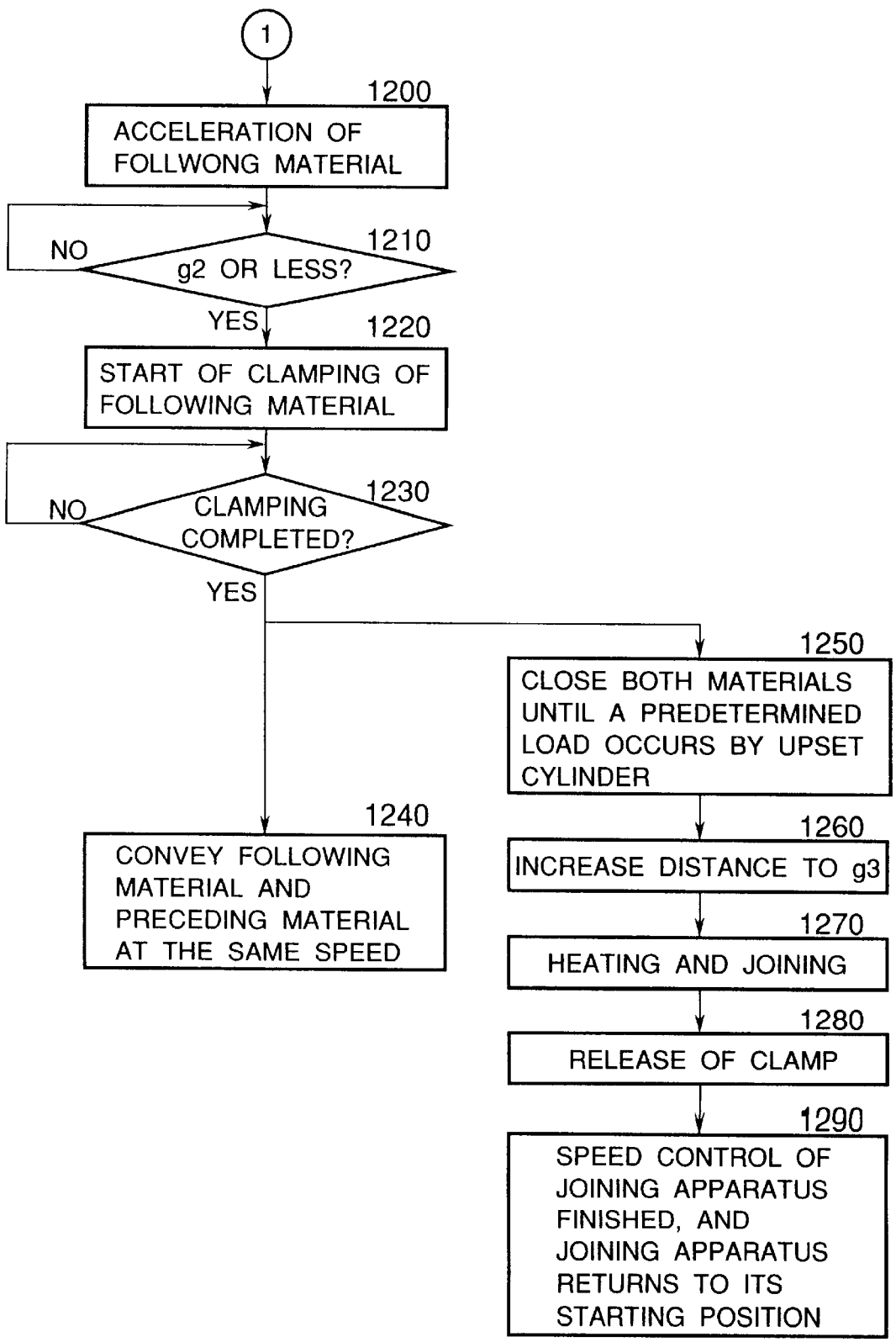
FIG. 5 is a flowchart showing the second half of processing procedure in the first embodiment.
Figure 11:
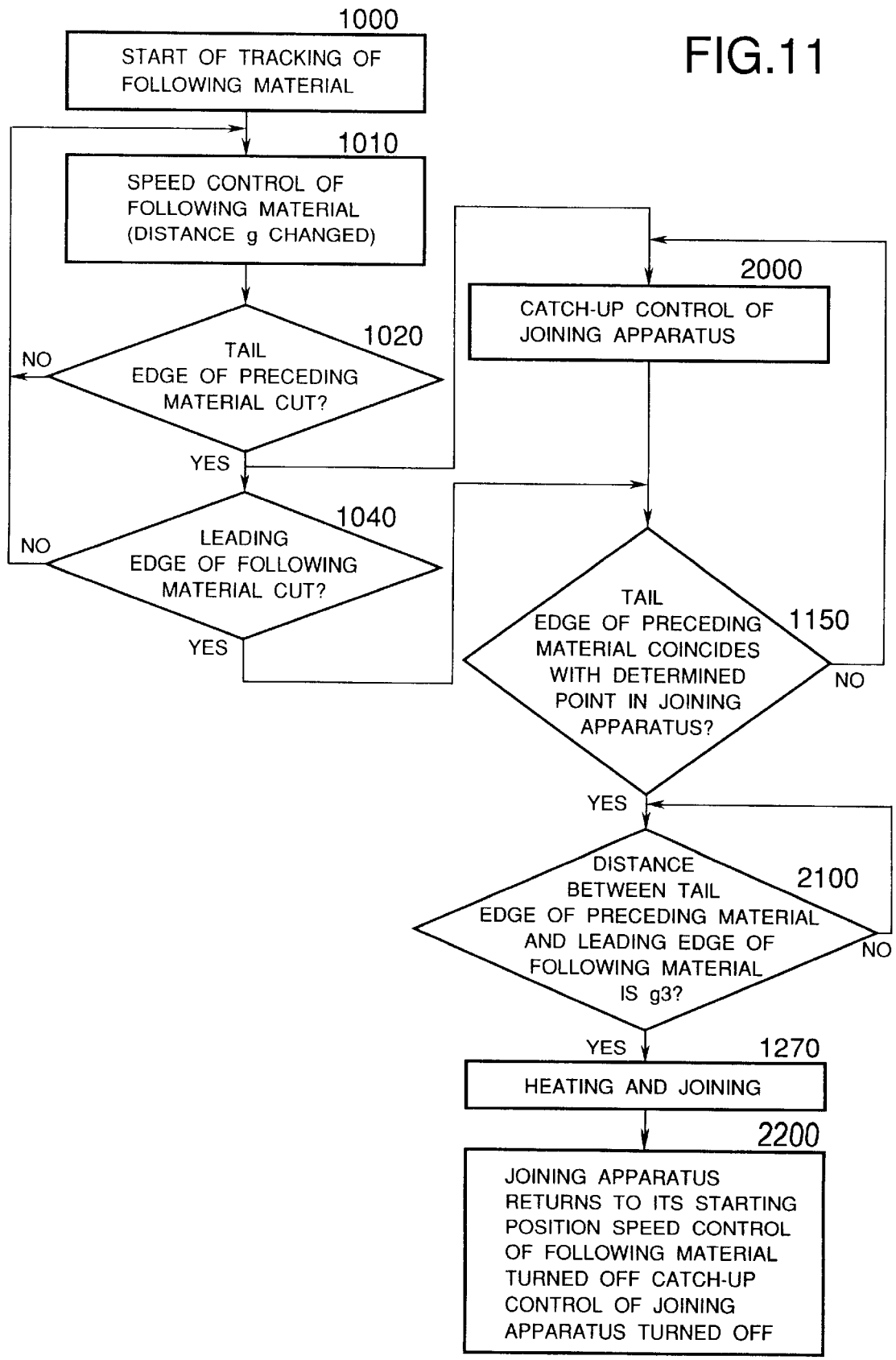
FIG. 11 is a flowchart showing another example of processing procedure in accordance with the present invention.

The procedure for control in this case is shown in FIG. 11 so as to correspond with FIGS. 4 and 5.

The control goes to Step 2000 through Steps 1000 to 1040, which are the same as the steps shown in FIGS. 4 and 5. In Step 2000, the catch-up control of the joining apparatus 24 is carried out to cause the determined point in the joining apparatus 24 to coincide with the tail edge 10B of the preceding material. If the coincidence is verified in Step 1150, the distance between the tail edge 10B of the preceding material and the leading edge 12A of the following material is made a predetermined value of g3 which is suitable for joining in Step 2100. After the heating and joining are completed in Step 1270, the speed control of the following material 12 and the catch-up control of the joining apparatus 24 are stopped in Step 2200, and the joining apparatus 24 returns to its starting position.

On the other hand, although the above description is such that the tail edge of the preceding material and the leading edge of the following material are cut before being clamped, they may be cut after being clamped. In this case, because the joining apparatus has a cutting function, the joining apparatus becomes heavy in weight and the capacity of motor for traveling the joining apparatus increases, and also a contrivance is needed to decrease the reduction in material temperature during cutting.

The following is a description of a method for determining the distance between the tail edge of the preceding material and the following material in the case where a crop cutting apparatus is not provided.

Figure 12:
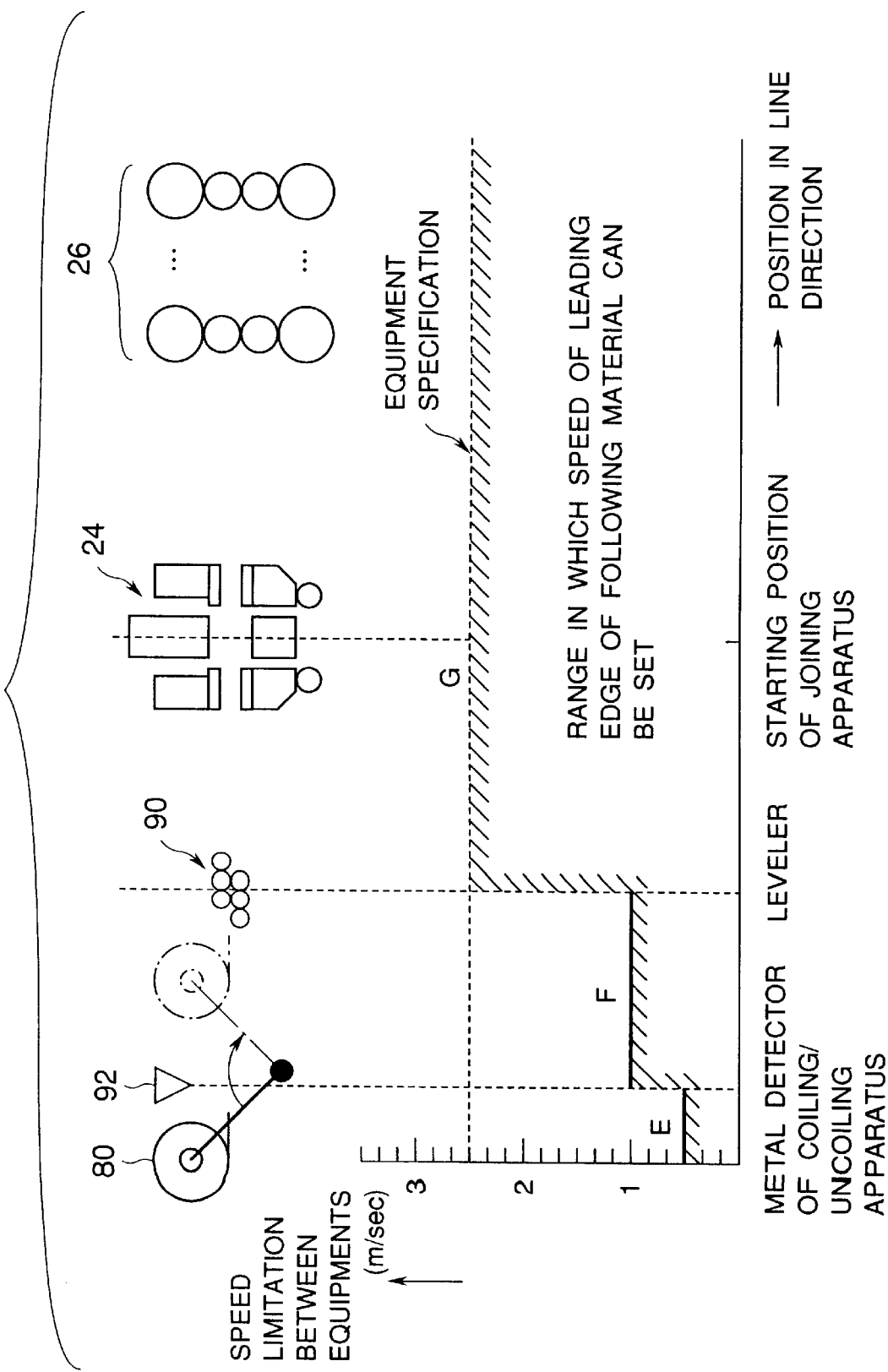
FIG. 12 is a diagram showing positions on the line and the limitation of speed variable range of each section.

For example, an equipment train is considered in which the coiling/uncoiling apparatus 80, a leveler 90 for straightening curled materials, the movable joining apparatus 24, and the finish rolling mill 26 are arranged in the named order from the upstream side as shown in FIG. 12, and a case where a metal detector 92 for detecting the completion of uncoiling of the leading edge of metal blocks is provided between the coiling/uncoiling apparatus 80 and the leveler 90 is explained.

The speed between the pieces of the equipment has, for example, the following limitations.

i) Between the coiling/uncoiling apparatus 80 and the metal detector 92 (section E in FIG. 12), since the driving torque at the time of uncoiling is great, the speed is lower than the speed of the preceding material conveyed at the entrance-side speed of the finish rolling mill 26, and the maximum speed is limited to, for example, 0.5 m/second.

ii) Between the metal detector 92 and the leveler 90 (section F in FIG. 12), the maximum speed at the time when the material enters the leveler 90 is limited to, for example, 1.0 m/second.

iii) Between the leveler 90 and the joining apparatus 24 (section G in FIG. 12), the speed is limited to, for example, 2.5 m/second (the maximum speed) for the reason of equipment specification.

Therefore, the catch-up speed pattern of the following material is not a constant speed, but inevitably a stepwise speed. Specifically, under such limiting conditions, the catch-up speed pattern of the following material with respect to the maximum speed of the preceding material, i.e., the speed setting for each section must be not higher than the speed limiting value for that section. Also, the timing for the following material to be uncoiled must be the optimum.

Figure 13:
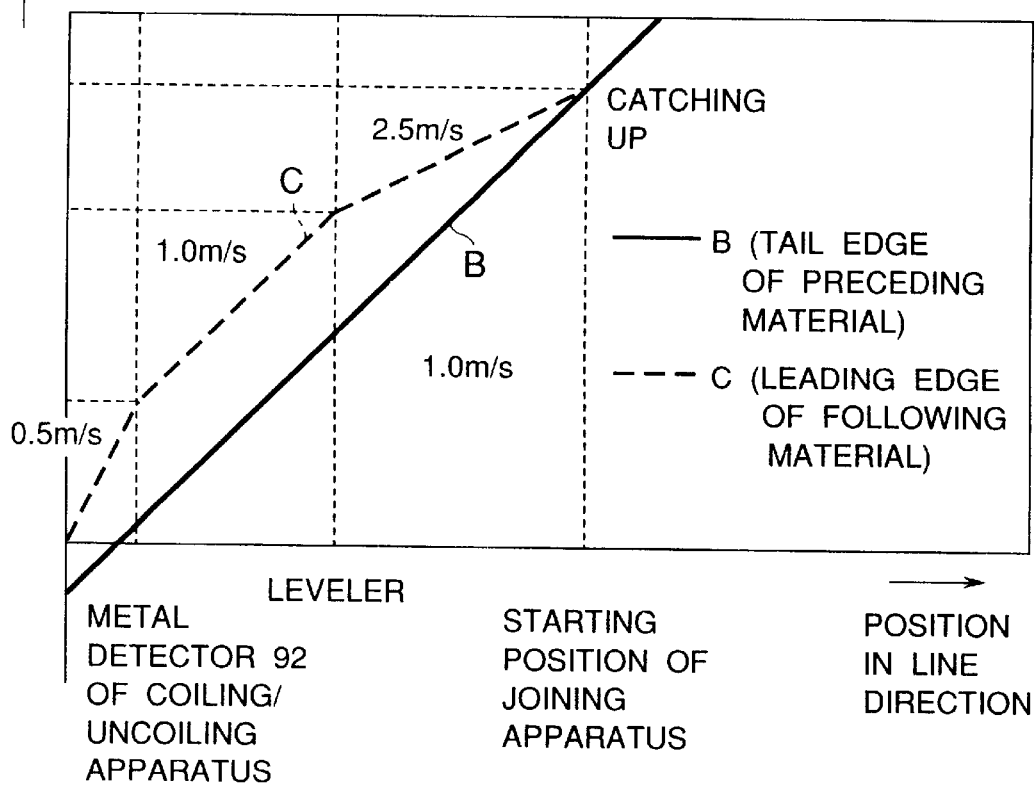
FIG. 13 is a diagram showing a state in which the leading edge of a following material catches up with the tail edge of a preceding material by catch-up control of the present invention.
Figure 14:
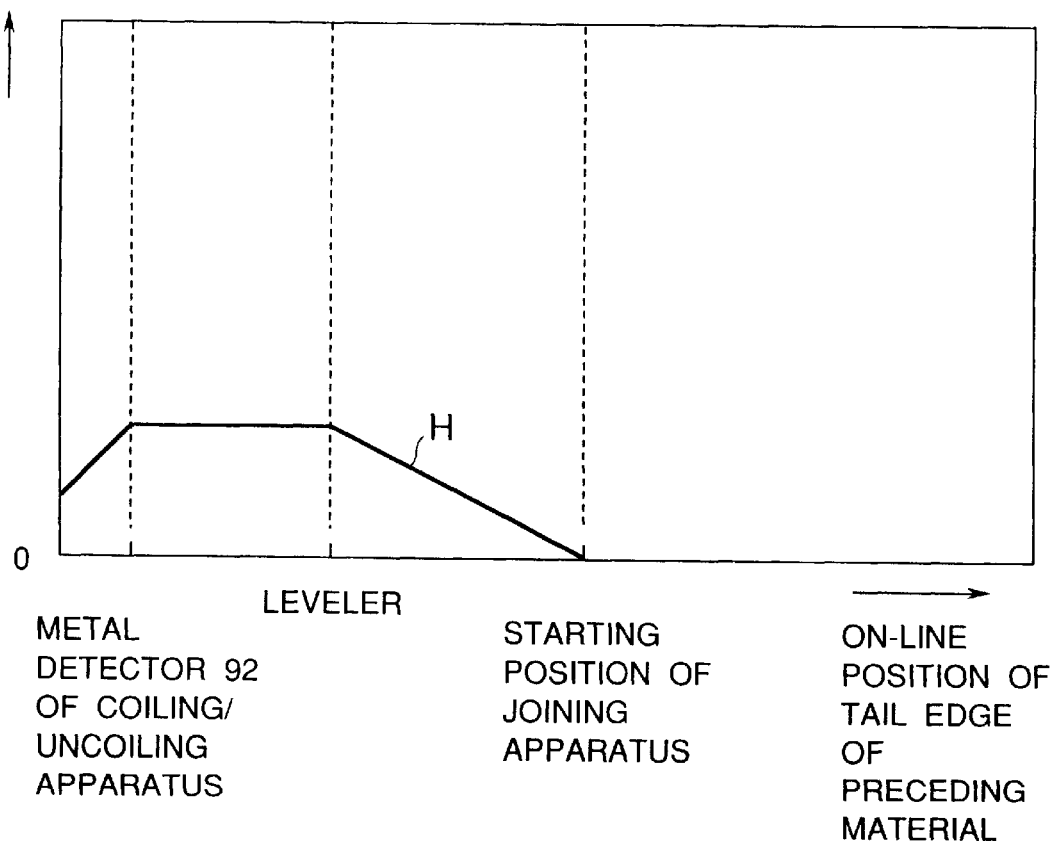
FIG. 14 is a diagram showing a change in relationship between the tail edge of a preceding material and the leading edge of a following material with respect to the position of the tail edge of the preceding material on the line in the catch-up control of the present invention.

Let it be assumed that the maximum value of traveling speed of the preceding material is 1 meter/second, and the catch-up speed pattern of the following material that catches up with the preceding material is 0.5 meter/second in the section E, 1.0 meter/second in the section F, and 2.5 meter/second in the section G. Also, it is assumed that the leading edge of the following material catches up with the tail edge of the preceding material at the center of the joining apparatus 24 as shown in FIG. 13. Then, in this standard case where the leading edge of the following material catches up with the tail edge of the preceding material at the center of the joining apparatus 24, the change in the distance with time between the tail edge of the preceding material and the leading edge of the following material is indicated by the solid line H in FIG. 14.

Figure 15:
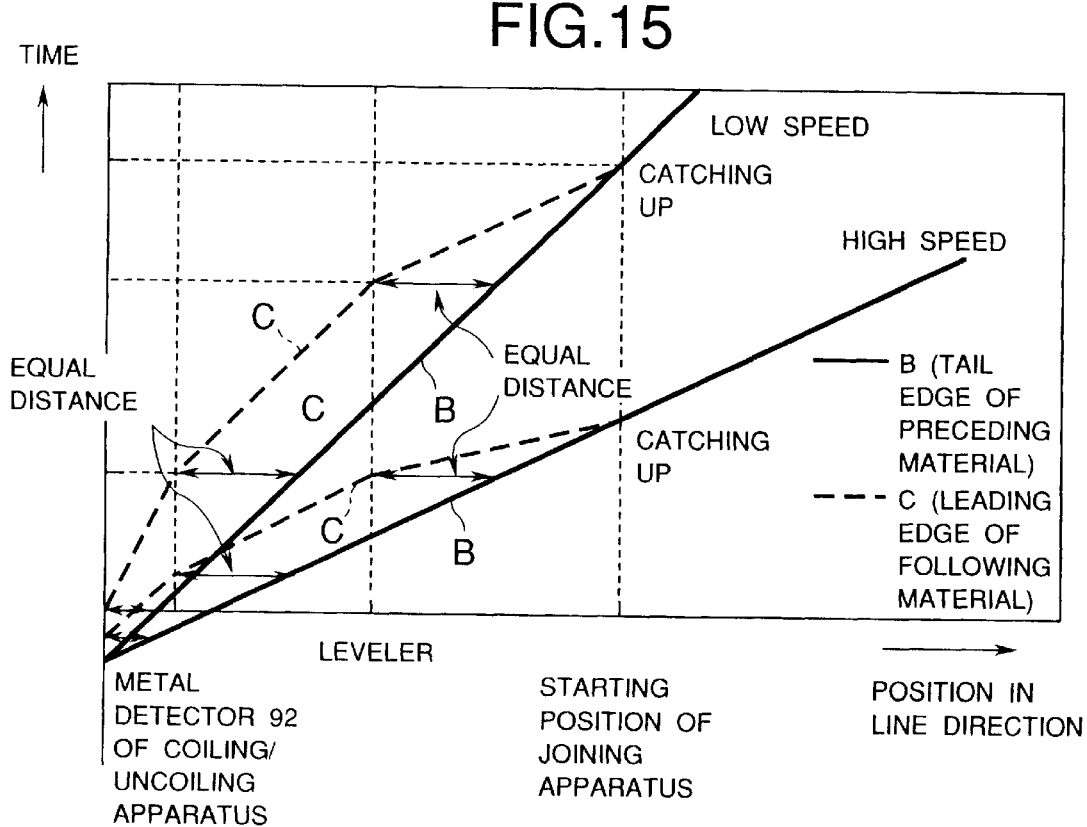
FIG. 15 is a diagram showing a state of catch-up control of the following material in a case where the traveling speed level of the tail edge of the preceding material is changed.
Figure 16:
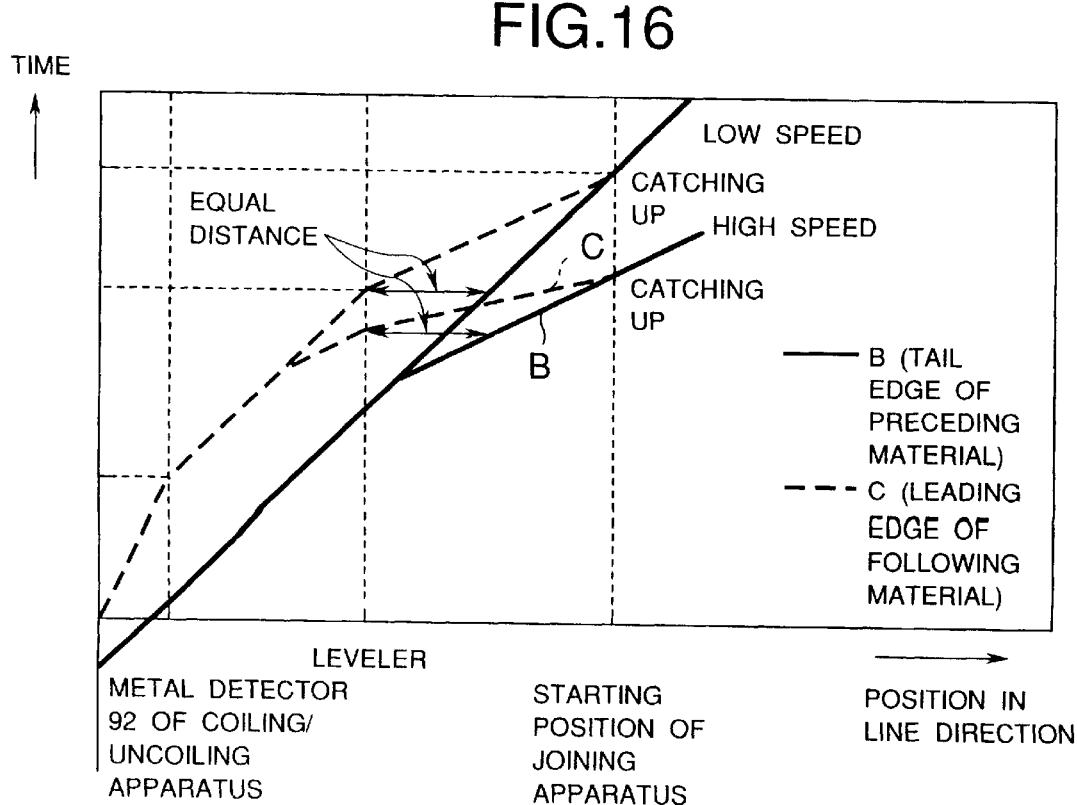
FIG. 16 is a diagram showing a state of catch-up control of the leading edge of the following material in a case where the traveling speed of the tail edge of the preceding material is changed halfway.

In the above-described method, it is preferable that the traveling speed of the preceding material be substituted by the maximum value of the assumable speed of the metal block, or the speed may be substituted by the upper limit value of the speed of equipment, for example, the maximum speed of the joining apparatus. If the speed is set in this way, even if the speed of the preceding material becomes low as shown in FIG. 15, or even if, for example, there is a thickness change during rolling, the distance is determined by the higher predicted speed. Therefore, as shown in FIG. 16, even if the traveling speed of the preceding material changes to a lower speed during the catch-up traveling control of the following material, the catching up can be performed surely. Moreover, even if the position on the line of the tail edge of the preceding material at the time when the thickness change during rolling begins, deviates from the predicted position by an error, the catching up can be performed surely.

Figure 17:
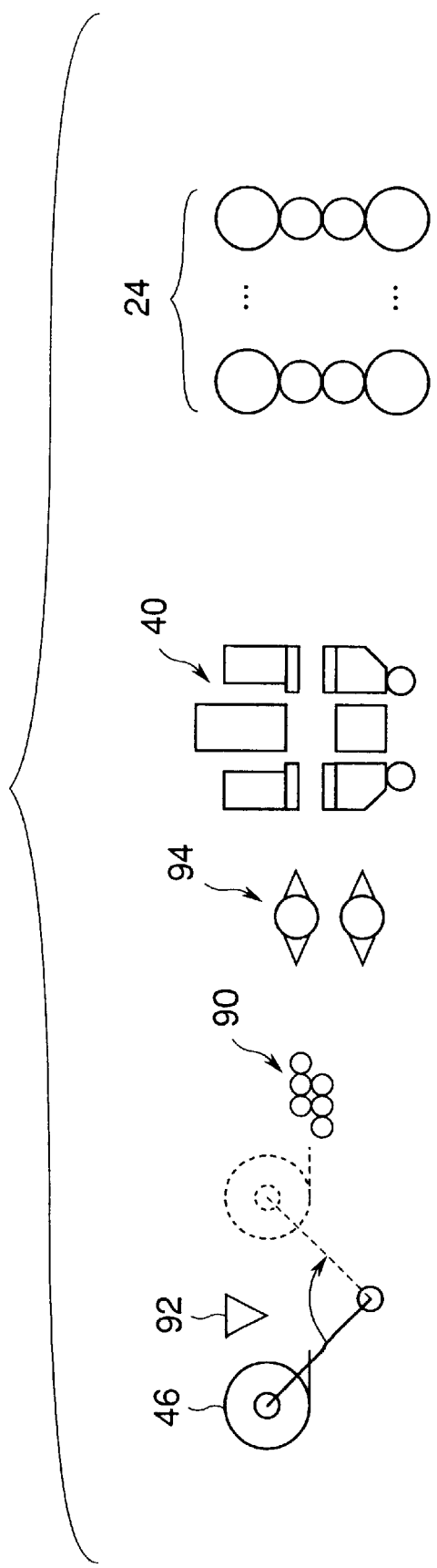
FIG. 17 is a process view showing a state in which a crop cutting apparatus is provided to form the tail edge of a preceding material and the leading edge of a following material in the catch-up control of the present invention.

The following is a description of a method for determining the distance between the tail edge of the preceding material and the leading edge of the following material in the case where the crop of the end face to be joined is cut before joining by using a crop cutting apparatus (for example, a crop shear) 94 provided in front of the joining apparatus 24 as shown in FIG. 17.

In this case, the tail edge of the preceding material may be cut at the timing at which the cutting point comes. However, about 2 to 3 seconds are needed including the blade waiting position reset time for cutting the following material after the preceding material is cut, so that the entrance of the following material must be delayed for this time or more.

Because it is difficult to carry out the control of the delay for the above-described time, the distance corresponding to this time is predicted in advance, and the traveling control of the following material is carried out so as to separate this distance or more. Specifically, when the tail edge of the preceding material is cut by the crop cutting apparatus 94, a distance is provided between the tail edge of the preceding material and the leading edge of the following material so that a preparatory period of time can be taken to cut the leading edge of the following material after the tail edge of the preceding material is cut.

In order to cut the leading edge of the following material by the crop cutting apparatus 94, it is necessary only that the above-described distance or more is provided. However, after the following material is cut, it is necessary for the following material to catch up with the tail edge of the preceding material as soon as possible. There is little problem if the traveling speed after cutting can be made high. However, the acceleration time is necessary, and when the following material approaches the preceding material, the deceleration time is also necessary. It should be preferably avoided that the motor power for acceleration and deceleration increase wastefully. Although it is possible that the starting position of the joining apparatus is located farther to increase the catch-up distance, the line is lengthened, resulting in not only wasteful investment but also decrease in temperature. For this reason, the distance cannot be increased unnecessarily. Thus, the following control is carried out.

Figure 18:
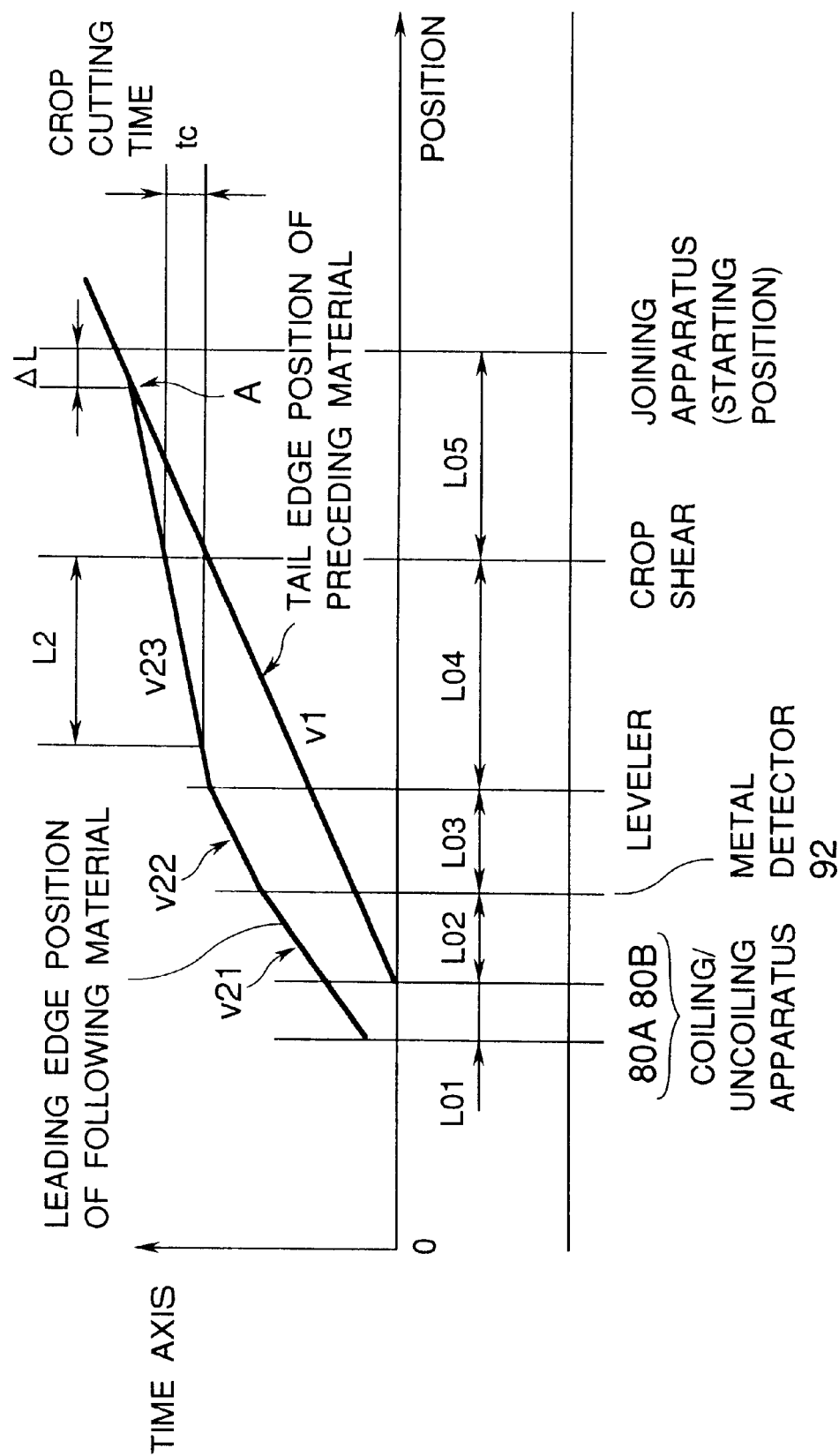
FIG. 18 is a diagram showing a state in which the leading edge of a following material catches up with the tail edge of a preceding material in FIG. 17.

For example, as shown in FIG. 18, let the distance between two coiling/uncoiling apparatuses 80A and 80B be L01, the distance between the delivery-side coiling/uncoiling apparatus 80B and the metal detector 92 be L02, the distance between the metal detector 92 and the leveler 90 be L03, the distance between the leveler 90 and the crop cutting apparatus 94 be L04, the distance between the crop cutting apparatus 94 and the start position of the joining apparatus 24 be L05, the speeding of the preceding material for a period of time from when the tail edge of the preceding material leaves the coiling/uncoiling apparatus 80B to when it passes through the joining apparatus 24 be V1, the predicted speed of the following material between the coiling/uncoiling apparatus 80A and the metal detector 92 be V21, the predicted speed between the metal detector 92 and the leveler 90 be V22, and the speed between the leveler 90 to a position where the speed of the following material becomes the same as the speed of the preceding material be V23. Then, the theoretical distance L2 corresponding to the crop cutting time tc excluding the crop cut amount, deviation, poor response, etc. is expressed as follows.

$$L2 = v23 \times tc \quad (3)$$

$$(L05-\Delta L)/v1 = (L05-\Delta L \times L2)/v23 \quad (4)$$

Thereby, the distance ΔL from the time when the speed of the following material becomes the same as the speed of the preceding material to the time when the following material reaches the joining apparatus 24 can be obtained by the following equation.

$$\Delta L = L05 - L2 \times v1/(v23-v1) = L05 - tc \times v1 \cdot V23/(v23-v1) \quad (5)$$

However, the lower limit is provided because when the speed v1 of the preceding material becomes very low, the distance L2 corresponding to the crop cutting time tc becomes excessively small.

In the embodiment,
v21max=0.5 m/s (the section E in FIG. 12)
v22max=1.0 m/s (the section F in FIG. 12)
v23max=2.5 m/s (the section G in FIG. 12)
L01=2350 mm
L02=1300 mm
L03=5000 mm
L04=5000 mm
L05=8350 mm
the maximum speed of the preceding material Vmax=1 m/s Therefore, when the speed of the preceding material v1=1 m/s, and the crop cutting time tc=3 seconds, $$\Delta L = 8350 - 3 \times 1000 \times 2500/(2500-1000) = 350 \text{ mm}$$

On the other hand, L2=2500×2.5=6250 mm and when the tail edge of the preceding material is cut, it corresponds to the timing when the leading edge of the preceding material is somewhat before the leveler. If the crop cutting time tc or the crop cutting amount varies, or if the speed v1 of the preceding material varies, the leading edge position of the following material with respect to the tail edge cutting timing of the preceding material changes.

Also, ΔL=3350 mm, having a positive value. Therefore, the preceding material can be ensured the time tc for crop cutting, and also the distance between both materials can be made zero on the upstream side of the starting position of the joining apparatus 24.

It should be avoided that the following material collide with the preceding material at v23 before the catch-up point A. For this reason as well, ΔL functions effectively as a distance for deceleration for the following material from v23 to v1. Needless to say, in order for the following material to catch up with the preceding material even if the speed of the preceding material becomes faster than the predicted speed, v21, v22 and v23 may be set with a margin with respect to the capacity of the traveling system.

As an example of providing a margin with respect to the maximum capacity of v21, v22 and v23, these speeds may be set as follows:

$$V21 = V21\text{max} \times 0.8$$

$$V22 = V22\text{max} \times 0.8$$

$$V23 = V23\text{max} \times 0.8$$

Figure 19:
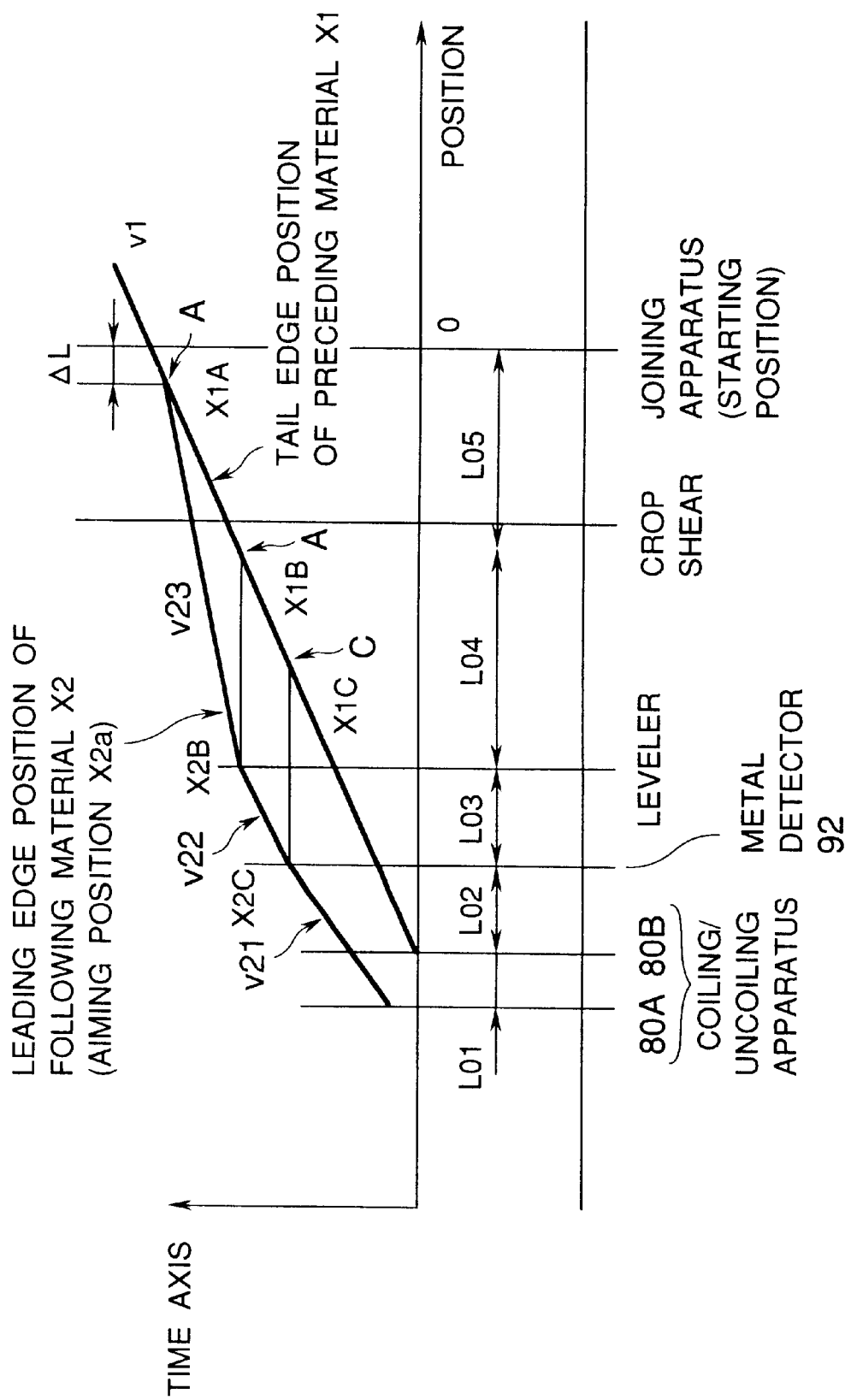
FIG. 19 is a diagram for illustrating a calculation method in FIG. 17.

For example, as shown in FIG. 19, the aiming distance g is obtained as described below, taking the traveling speed of the preceding material as V1, the tail edge position of the preceding material as X1, the aiming position of the leading edge of the following material as X2a, and the actual position of the leading edge of the following material as X2.

As for determining X2a, because the position of the following material is indicated by a polygonal line, the position X1 of the preceding material corresponding each bend point on the polygonal line has been determined in advance, then the function of the corresponding X2a is determined before and after each point.

An example of the bend point and the function of the aiming position X2a of the following material will be shown below. Since both of the speed of the preceding material and the speed of the following material are made constant in each section, the function X2a is expressed as an equation of the first degree of the tail edge position X1 of the preceding material.

Taking the starting position of the joining apparatus 24 as zero on the X-coordinate, the X-coordinate of each bend point is as follows:

For preceding material
    Point A X1A=−ΔL (as described before)
    Point B X1B=X1A−(L04+L05−ΔL)/v23×v1
    Point C X1C=X1B−L03/v22×v1
For following material
    Point B X2B=−(L05+L04)
    Point C X2C=X2B−L03
The aiming position X2a of the following material is expressed as follows:
When X1<X1C $$X2a = X2C + (X1-X1C) \times v21/v1$$

When X1C≦X1<X1B $$X2a = X2C + (X1-X1C) \times v22/v1$$

When X1B≦X1

$$X2a = X2B + (X1-X1B) \times v23/v1$$

Thereupon, the aiming distance g between the tail edge of the preceding material and the leading edge of the following material is expressed by the following equations.
When X1<X1C $$g = X1 - X2a = \{1-(v21/v1)\}X1 + (v21/v1)X1C - X2C$$

When X1C≦X1<X1B $$g = X1 - X2a = \{1-(v22/v1)\}X1 + (v22/v1)X1C - X2C$$

When X1B≦X1

$$g = X1 - X2a = \{1-(v23/v1)\}X1 + (v23/v1)X1b - X2B$$

Figure 20:
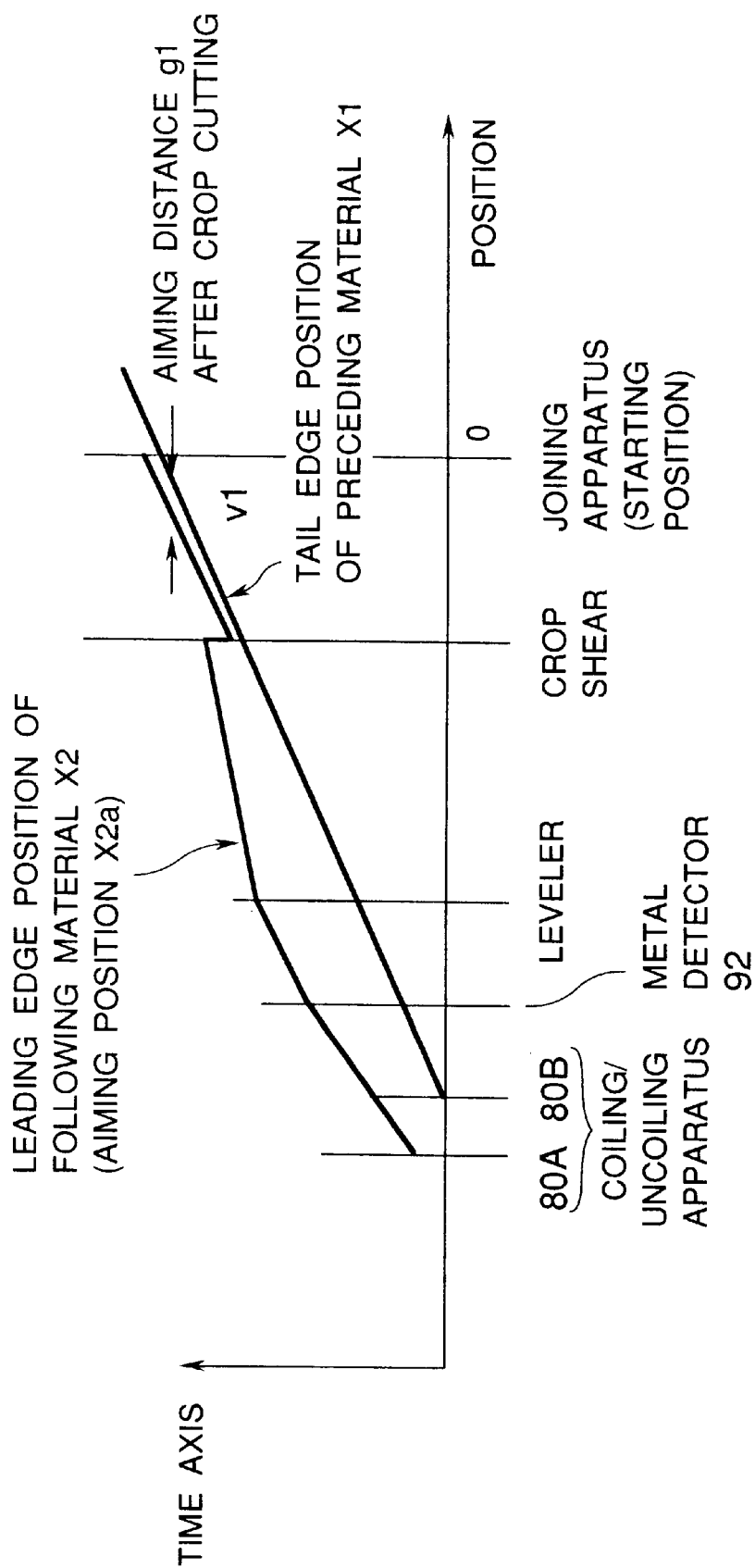
FIG. 20 is a diagram showing a modified example of FIG. 19.

In FIG. 19, the explanation has been given assuming that the distance (gap) becomes zero at point A on the upstream side of the starting point of the joining apparatus 24. However, as shown in FIG. 20, the distance should be made the aiming value g1 after the leading edge of the following material is cut. Subsequently, the aiming distance is narrowed in accordance with the advance of the clamp, as shown in FIG. 4. Needless to say, after the crop cutting, the distance control using this function may be continued. In this case, the lower limit is g1.

As described above, the aiming distance g is a function of the tail edge position X1 of the preceding material.

Figure 21:
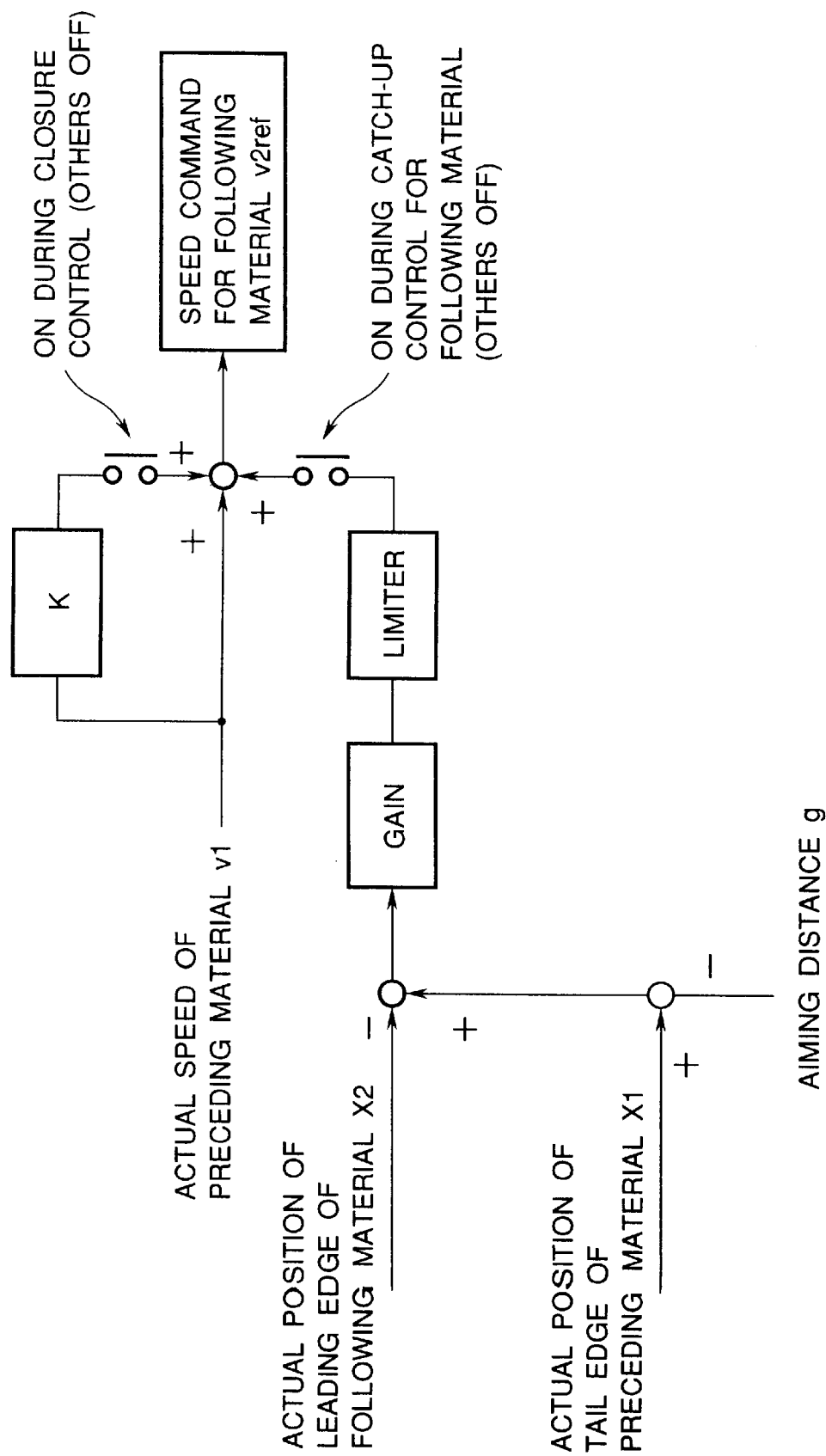
FIG. 21 is a block diagram showing a configuration of a control unit for carrying out catch-up control of the present invention.

Therefore, in the catch-up control of the following material, as shown in FIG. 21, the output of (X1−g)−X2 is multiplied by a gain so that the difference between the actual position X1 of the tail edge of the preceding material and the aiming distance g coincide with the actual position X2 of the leading edge of the following material, and the sum of the above-described value and the actual speed of the preceding material can be made a speed command for the following material. When the tail edge of the preceding material and the leading edge of the following material are closed until a predetermined load occurs, the sum of the value obtained by multiplying the speed of the preceding material by K plus the speed of the preceding material is made a speed command for the following material.

The limiter is the maximum speed in each section, and K is preferably about 0.15. Instead of the value in this example obtained by multiplying the speed of the preceding material by K, a fixed value of the maximum value (1 m/s)×K(0.15)= 0.15 m/s of the speed of the preceding material may be added.

The starting of the following material may be the time when the tail edge of the preceding material advances to a position such that the aiming position X2a of the following material become the position of the entrance-side coiling/uncoiling apparatus 80A, i.e., the following equation holds.

$$X2a \geq -(L01+L02+L03+L04+L05)$$

The following is a description of an experimental example.

On the hot rolling line shown in FIG. 8, a preceding metal block and a following metal block, both of which have a thickness of 260 mm, a width of 1000 mm, and a length of 9 meter, were heated at 1200° C. in the heating furnace 20. The following metal block was extracted from the heating furnace 20 sixty-five seconds after the preceding metal block was extracted from the heating furnace 20. Rough rolling was performed by the rough rolling mill 22, and then the preceding and the following metal blocks were coiled by the coiling/uncoiling apparatus 80. Subsequently, the preceding metal block was uncoiled, and then the following metal block was uncoiled after 1.5 seconds in accordance with the result of prediction calculation of the required time tP from when the tail edge of the preceding metal block was uncoiled from the coiling/uncoiling apparatus 80B to when the leading edge of the following metal block caught up with the tail edge of the preceding material, which was performed by Equation (2).

The traveling speed of the preceding metal block was v=1.0 m/s, and the traveling speed of the following metal block followed, as shown in FIG. 12, the standard pattern of 0.5 m/s from when the following metal block was uncoiled from the coiling/uncoiling apparatus 80A to when the leading edge thereof entered the metal detector 92, 1.0 m/s to when the metal block entered the leveler 90, and 2.5 m/s to when the following metal block caught up with the preceding metal block. During the catch-up control, the positions of the tail edge of the preceding metal block and the leading edge of the following metal block were detected by the position/speed detectors 40 and 42 in real time, and the traveling of the following metal block was controlled so that the leading edge of the following metal block come to the aiming position of the following metal block, which was determined by the function of the position of the preceding metal block at the time of the standard pattern. Specifically, the distances between the tail edge of the preceding metal block and the leading edge of the following metal block were g1=150 mm, g2=50 mm, and g3=5 mm.

Further, between the leveler 90 and the aiming catch-up position T, the tail edge of the preceding metal block and the leading edge of the following metal block were cut at right angles to the traveling direction by the crop cutting apparatus 94. At the timing at which the tail edge of the preceding metal block turned off the metal detector 44, the tracking of the tail edge of the preceding metal block was corrected by the position/speed detector 42. At the timing at which the leading edge of the following metal block turned on the metal detector 44, the tracking of the leading edge of the following metal block was corrected by the position/speed detector 40. Further, at the timing at which the metal detector 48 for detecting tail edge of the preceding metal block coming onto the joining apparatus 24 was turned off, the position recognition of the tail edge of the preceding metal block was corrected, and as calculated by the following equation, the joining apparatus 24 started to run when the tail edge of the preceding metal block came to a position on the 1.0 meter upstream side of the entrance side of the joining apparatus 24.

$$x=v^2/2/\alpha+v\cdot t=1.0^2/2/1+1.0\times0.5=1.0 \text{ meter}$$

where, α is the acceleration of the joining apparatus (1.0 meter/second$^2$), and t is a start delay of the joining apparatus (0.5 second).

At the timing at which the tail edge of the preceding metal block entered the visual field (the visual field was made ±250 mm so that both of the leading edge of the following material which become 150 mm on the entrance side when the alignment of the preceding material with the joining apparatus was completed and the tail edge of the preceding material entered the visual field) of the image pickup device 46 disposed on the joining apparatus 24, the position recognition of the tail edge of the preceding metal block was changed over to the position recognition value obtained by the image pickup device 46. At the timing at which the leading edge of the following metal block turned on the metal detector 48, the position recognition of the leading edge of the following metal block was corrected, and also the control was carried out so that the tail edge of the preceding metal block obtained by the image pickup device 46 coincides with the determined position of the joining apparatus 24. During this control, the control of the following metal block was continued to determine the aiming leading edge position of the following metal block by the function of two values of the traveling speed predicted value of the preceding metal block (1.0 m/s) and the actual value of the tail edge position of the preceding metal block. When the distance between the leading edge of the following metal block and the tail edge of the preceding metal block became 150 mm, the following metal block traveled at the same speed as that of the preceding metal block.

At the timing at which the tail edge of the preceding metal block was held by the delivery-side clamp 64, and the leading edge of the following metal block entered the visual field of the image pickup device 46, the position recognition of the leading edge of the following metal block was corrected, and the control was carried out so that the distance between both the metal blocks be closed.

Since the following metal block moved at a higher speed than the preceding metal block, when the distance g between both the metal blocks, which was detected by the image pickup device 46, became 50 mm or less, the clamping operation for the following metal blocks started. When the clamping operation was completed, the distance between both the metal blocks was made zero.

Next, the following metal block 12 was pushed toward the preceding metal block 10 with a force of 100 kN by using the upset cylinder 68, and the completion of closure was judged.

After this series of operations, the metal blocks were joined by the joining means in the joining apparatus 24, and then fed to the finish rolling mill 26. When continuous rolling was performed, the metal block could be rolled properly without breakage.

Although the present invention has been applied to a metal block in the above description, the application of the present invention is not limited to a block. It is apparent that the present invention can be applied in the same way to other metal pieces.

Industrial Applicability

According to the present invention, on the hot rolling line, three of the tail edge of the preceding material, the leading edge of the following material, and the movable joining apparatus can be controlled at the aiming position on the line so as to be in a positional relationship suitable for joining. Therefore, the joining can be completed properly in the travel zone of the joining apparatus, and the subsequent continuous finish rolling can be performed properly.

What is claimed is:

1. A hot rolling method in which a tail edge of a preceding material and a leading edge of a following material are joined to each other during traveling by a movable joining apparatus after hot rough rolling, and the materials are fed to a finish rolling mill to be rolled, characterized in that
   a speed of the following material is controlled according to the position of the tail edge of the preceding material so that a distance between the tail edge of the preceding material and the leading edge of the following material become a desired value,
   whereby the tail edge of the preceding material and the leading edge of the following material are joined to each other during traveling.

2. The hot rolling method according to claim 1, wherein when the tail edge of the preceding material coincides with a determined point in the joining apparatus, the tail edge of the preceding material is restrained by restraint means, and
   after the restraint of the preceding material is completed, a traveling speed of the following material is increased so that the following material come into contact with the tail edge of the preceding material.

3. The hot rolling method according to claim 1, wherein after the restraint of the tail edge of the preceding material is completed, a speed control of the joining apparatus is changed over to a speed control for making a tension of the preceding material a desired value.

4. The hot rolling method according to claim 1, wherein when the tail edge of the preceding material coincide with a determined point in the joining apparatus, the tail edge of the preceding material is restrained by restraint means, and
   when the distance between the tail edge of the preceding material and the leading edge of the following material becomes a predetermined value or less, the leading edge of the following material is restrained by the restraint means.

5. The hot rolling method according to claim 4, wherein after the restraint of the tail edge of the preceding material and the leading edge of the following material is completed, the tail edge of the preceding material and the leading edge of the following material are brought into contact with each other and are closed until a predetermined load occurs.

6. The hot rolling method according to claim 5, wherein after the distance between the tail edge of the preceding material and the leading edge of the following material are closed, a predetermined gap is provided.

7. The hot rolling method according to claim 1, wherein an image pickup device is provided on the joining apparatus so that the tail edge position of the preceding material is detected by the image pickup device.

8. The hot rolling method according to claim 7, wherein the leading edge position of the following material is also detected by the image pickup device.

9. A hot rolling method in which a tail edge of a preceding material and a leading edge of a following material are joined to each other during traveling by a movable joining apparatus after hot rough rolling, and the materials are fed to a finish rolling mill to be rolled, characterized in that
   a distance between the tail edge of the preceding material and the leading edge of the following material is determined in advance as a function of at least the tail edge position of the preceding material,
   an actual tail edge position of the preceding material is measured when the tail edge of the preceding material and the leading edge of the following material are joined to each other,
   the distance between the tail edge of the preceding material and the leading edge of the following material is determined from the measured tail edge position of the preceding material and the function, and
   the position of the leading edge of the following material is controlled by the speed of the following material so as to obtain the distance,
   whereby the tail edge of the preceding material and the leading edge of the following material are joined to each other during traveling.

10. The hot rolling method according to claim 9, wherein after the restraint of the tail edge of the preceding material is completed, a speed control of the joining apparatus is changed over to a speed control for making a tension of the preceding material a desired value.

11. The hot rolling method according to claim 9, wherein when the tail edge of the preceding material coincides with a determined point in the joining apparatus, the tail edge of the preceding material is restrained by restraint means, and
   after the restraint of the preceding material is completed, a traveling speed of the following material is increased so that the following material comes into contact with the tail edge of the preceding material.

12. The hot rolling method according to claim 9, wherein when the tail edge of the preceding material coincides with a determined point in the joining apparatus, the tail edge of the preceding material is restrained by restraint means, and
   when the distance between the tail edge of the preceding material and the leading edge of the following material becomes a predetermined value or less, the leading edge of the following material is restrained by the restraint means.

13. The hot rolling method according to claim 12, wherein after the restraint of the tail edge of the preceding material and the leading edge of the following material is completed, the tail edge of the preceding material and the leading edge of the following material are brought into contact with each other and are closed until a predetermined load occurs.

14. The hot rolling method according to claim 13, wherein after the tail edge of the preceding material and the leading edge of the following material are closed, a predetermined gap is provided.

15. The hot rolling method according to claim 9, wherein an image pickup device is provided on the joining apparatus so that the tail edge position of the preceding material be detected by the image pickup device.

16. The hot rolling method according to claim 15, wherein the leading edge position of the following material is also detected by the image pickup device.

17. A hot rolling method in which a tail edge of a preceding material and a leading edge of a following material are joined to each other during traveling by a movable joining apparatus after hot rough rolling, and the materials are fed to a finish rolling mill to be rolled, characterized in that a speed of the following material is controlled according to a position of the tail edge of the preceding material so that a distance between the tail edge of the preceding material and the leading edge of the following material become a desired value, and a traveling speed of the joining apparatus is controlled so that the tail edge of the preceding material coincide with a determined point in the joining apparatus, whereby the tail edge of the preceding material and the leading edge of the following material are joined to each other during traveling.

18. The hot rolling method according to claim 17, wherein after the restraint of the tail edge of the preceding material is completed, a speed control of the joining apparatus is changed over to a speed control for making a tension of the preceding material a desired value.

19. The hot rolling method according to claim 17, wherein an image pickup device is provided on the joining apparatus so that the tail edge position of the preceding material be detected by the image pickup device.

20. The hot rolling method according to claim 19, wherein the leading edge position of the following material is also detected by the image pickup device.

21. The hot rolling method according to claim 17, wherein when the tail edge of the preceding material coincides with the determined point in the joining apparatus, the tail edge of the preceding material is restrained by restraint means, and when a distance between the tail edge of the preceding material and the leading edge of the following material becomes a predetermined value or less, the leading edge of the following material is restrained by the restraint means.

22. The hot rolling method according to claim 21, wherein after the restraint of the tail edge of the preceding material and the leading edge of the following material is completed, the tail edge of the preceding material and the leading edge of the following material are brought into contact with each other and are closed until a predetermined load occurs.

23. The hot rolling method according to claim 22, wherein after the tail edge of the preceding material and the leading edge of the following material are closed, a predetermined gap is provided.

24. The hot rolling method according to claim 17, wherein when the tail edge of the preceding material coincides with the determined point in the joining apparatus, the tail edge of the preceding material is restrained by restraint means, and after the restraint of the preceding material is completed, the traveling speed of the following material is increased so that the following material comes into contact with the tail edge of the preceding material.

25. A hot rolling method in which a tail edge of a preceding material and a leading edge of a following material are joined to each other during traveling by a movable joining apparatus after hot rough rolling, and the materials are fed to a finish rolling mill to be rolled, characterized in that a distance between the tail edge of the preceding material and the leading edge of the following material is determined in advance as a function of the tail edge position of the preceding material, an actual tail edge position of the preceding material is measured when the tail edge of the preceding material and the leading edge of the following material are joined to each other, a distance between the tail edge of the preceding material and the leading edge of the following material is determined from the measured tail edge position of the preceding material and the function, a position of the leading edge of the following material is controlled by a speed of the following material so as to obtain the distance, and a running speed of the joining apparatus is controlled so that the tail edge of the preceding material coincide with a determined point of the joining apparatus, whereby the tail edge of the preceding material and the leading edge of the following material are joined to each other during traveling.

26. The hot rolling method according to claim 25, wherein when the tail edge of the preceding material coincides with the determined point in the joining apparatus, the tail edge of the preceding material is restrained by restraint means, and after the restraint of the preceding material is completed, a traveling speed of the following material is increased so that the following material comes into contact with the tail edge of the preceding material.

27. The hot rolling method according to claim 25, wherein when the tail edge of the preceding material coincides with the determined point in the joining apparatus, the tail edge of the preceding material is restrained by restraint means, and when the distance between the tail edge of the preceding material and the leading edge of the following material becomes a predetermined value or less, the leading edge of the following material is restrained by the restraint means.

28. The hot rolling method according to claim 27, wherein after the restraint of the tail edge of the preceding material and the leading edge of the following material is completed, the tail edge of the preceding material and the leading edge of the following material are brought into contact with each other and are closed until a predetermined load occurs.

29. The hot rolling method according to claim 28, wherein after the tail edge of the preceding material and the leading edge of the following material are closed, a predetermined gap is provided.

30. The hot rolling method according to claim 25, wherein after the restraint of the tail edge of the preceding material is completed, a speed control of the joining apparatus is changed over to a speed control for making a tension of the preceding material a desired value.

31. The hot rolling method according to claim 25, wherein an image pickup device is provided on the joining apparatus so that the tail edge position of the preceding material is detected by the image pickup device.

32. The hot rolling method according to claim 31, wherein the leading edge position of the following material is also detected by the image pickup device.

33. Hot rolling equipment which joins a tail edge of a preceding material and a leading edge of a following material to each other during traveling by using a movable joining apparatus after hot rough rolling, and feeds the materials to a finish rolling mill to roll the same, characterized in that an image pickup device, which can image both of the tail edge of the preceding material and the leading edge of the following material, is provided on the joining apparatus.

* * * * *